United States Patent
Benkirane-Jessel

(10) Patent No.: US 12,521,469 B2
(45) Date of Patent: Jan. 13, 2026

(54) COMPOSITE PRODUCT FOR THE OSTEOARTICULAR REGENERATION OF CARTILAGE LESION

(71) Applicants: INSTITUT NATIONAL DE LA SANTE ET DE LA RECHERCHE MEDICALE (INSERM), Paris (FR); UNIVERSITÉ DE STRASBOURG, Strasbourg (FR)

(72) Inventor: Nadia Benkirane-Jessel, Kienheim (FR)

(73) Assignees: INSTITUT NATIONAL DE LA SANTE ET DE LA RECHERHE MEDICALE (INSERM), Paris (FR); UNIVERSITÉ DE STRADBOURG, Strasbourg (FR)

( * ) Notice: Subject to any disclaimer, the term of this patent is extended or adjusted under 35 U.S.C. 154(b) by 589 days.

(21) Appl. No.: 17/998,464

(22) PCT Filed: May 14, 2020

(86) PCT No.: PCT/EP2020/063549
§ 371 (c)(1),
(2) Date: Nov. 10, 2022

(87) PCT Pub. No.: WO2021/228402
PCT Pub. Date: Nov. 18, 2021

(65) Prior Publication Data
US 2023/0256138 A1   Aug. 17, 2023

(51) Int. Cl.
| | |
|---|---|
| *A61L 27/52* | (2006.01) |
| *A61L 27/26* | (2006.01) |
| *A61L 27/34* | (2006.01) |
| *A61L 27/38* | (2006.01) |
| *A61L 27/54* | (2006.01) |

(52) U.S. Cl.
CPC ........... *A61L 27/3847* (2013.01); *A61L 27/26* (2013.01); *A61L 27/34* (2013.01); *A61L 27/3834* (2013.01); *A61L 27/52* (2013.01); *A61L 27/54* (2013.01); *A61L 2300/414* (2013.01); *A61L 2400/12* (2013.01); *A61L 2420/08* (2013.01)

(58) Field of Classification Search
CPC ....................................................... A61L 27/52
See application file for complete search history.

(56) References Cited

U.S. PATENT DOCUMENTS

| | | |
|---|---|---|
| 2004/0241202 A1 | 12/2004 | Chluba et al. |
| 2013/0052254 A1 | 2/2013 | Arinzeh et al. |
| 2015/0086602 A1 | 3/2015 | Kipper et al. |

FOREIGN PATENT DOCUMENTS

| | | |
|---|---|---|
| JP | 2019-515753 A | 6/2019 |
| WO | 2002085423 A1 | 10/2002 |
| WO | 2006079928 A2 | 8/2006 |
| WO | 2012113812 A1 | 8/2012 |

OTHER PUBLICATIONS

International Search Report and Written Opinion for corresponding International application No. PCT/EP2020/063549; dated Feb. 10, 2021 (12 pages).
Bark, Stefan, et al. "Enhanced microfracture techniques in cartilage knee surgery: fact or fiction?." World Journal of Orthopedics 5.4 (2014): 444-449.
Beane, Olivia S., et al. "Isolation, characterization, and differentiation of stem cells for cartilage regeneration." Annals of Biomedical Engineering 40.10 (2012): 2079-2097.
Buda, Roberto, et al. "Osteochondral Lesions of the Knee: A New One-Step Repair Technique with Bone-Marrow-Derived Cells." The Journal of Bone and Joint Surgery 92.2 (2010): 2-11.
Caldwell, Kenneth L., et al. "Cell-based articular cartilage repair: the link between development and regeneration." Osteoarthritis and Cartilage 23.3 (2015): 351-362.
Cengiz, Ibrahim Fatih, et al. "Orthopaedic regenerative tissue engineering en route to the holy grail: disequilibrium between the demand and the supply in the operating room." Journal of Experimental Orthopaedics 5.1 (2018): 1-14.
Decher, Gero. "Fuzzy Nanoassemblies: Toward Layered Polymeric Multicomposites." Science 277.5330 (1997): 1232-1237.
Drevelle, Olivier, et al. "Biomimetic materials for controlling bone cell responses." Frontiers in Bioscience—Scholar 5.1 (2013): 369-395.
Giannini, Sandro, et al. "One-step repair in talar osteochondral lesions: 4-year clinical results and t2-mapping capability in outcome prediction." The American Journal of Sports Medicine 41.3 (2013): 511-518.
Goldring, Chris EP, et al. "Assessing the safety of stem cell therapeutics." Cell Stem Cell 8.6 (2011): 618-628.
Henkel, Jan, et al. "Henkel, Jan, et al. Bone Regeneration Based on Tissue Engineering Conceptions—A 21st Century Perspective." Bone Research 1.1 (2013): 216-248.
Ho, Yvonne Yiwan, et al. "Postoperative evaluation of the knee after autologous chondrocyte implantation: What radiologists need to know." Radiographics 27.1 (2007): 207-220.

(Continued)

*Primary Examiner* — Qiuwen Mi
(74) *Attorney, Agent, or Firm* — MENDELSOHN DUNLEAVY P.C.; Kevin J. Dunleavy

(57) ABSTRACT

The present invention relates to a biomaterial comprising: —a membrane wound patch (a), made of a nanofibrous polymeric scaffold, —a hydrogel (b) including autologous or allogenic bone marrow-derived mesenchymal stem cells, and —a bone wound patch (c) being a nanofibrous scaffold made of polymers, wherein said scaffold has a surface coated with an interrupted coating made of multilayered droplets, said multilayered droplets being droplets composed of at least one layer pair consisting of a layer of polyanions and a layer of polycations, and wherein the bone wound patch (c) further comprises a bone growth factor; wherein the hydrogel (b) is included between the membrane wound patch (a) and the bone wound patch (c).

20 Claims, 5 Drawing Sheets

(56) References Cited

OTHER PUBLICATIONS

Jessel, Nadia, et al. "Bioactive Coatings Based on a Polyelectrolyte Multilayer Architecture Functionalized by Embedded Proteins." Advanced Materials 15.9 (2003): 692-695.

Keller, L., et al. "Bi-layered Nano Active Implant with Hybrid Stem Cell Microtissues for Tuned Cartilage Hypertrophy." Journal of Stem Cell Research and Therapeutics 1.1 (2015): 1-9.

Keller, Laetitia, et al. "Preclinical safety study of a combined therapeutic bone wound dressing for osteoarticular regeneration." Nature Communications 10.1 (2019): 1-10.

Keller, Laetitia, et al. "Double compartmented and hybrid implant outfitted with well-organized 3D stem cells for osteochondral regenerative nanomedicine." Nanomedicine 10.18 (2015): 2833-2845.

Li, Wan-Ju, et al. "A three-dimensional nanofibrous scaffold for cartilage tissue engineering using human mesenchymal stem cells." Biomaterials 26.6 (2005): 599-609.

Lynn, David M. "Layers of opportunity: nanostructured polymer assemblies for the delivery of macromolecular therapeutics." Soft Matter 2.4 (2006): 269-273.

Magne, David, et al. "Mesenchymal stem cell therapy to rebuild cartilage." Trends in Molecular Medicine 11.11 (2005): 519-526.

Magnussen, Robert A., et al. "Treatment of Focal Articular Cartilage Defects in the Knee." Clinical Orthopaedics and Related Research 466.4 (2008): 952-962.

Marcacci, Maurilio, et al. "Treatment of cartilage lesions: What works and why ?." Injury 44.1 (2013): S11-S15.

Mckay, William F., et al. "A comprehensive clinical review of recombinant human bone morphogenetic protein-2 (INFUSER® Bone Graft)." International Orthopaedics 31.6 (2007): 729-734.

Mendoza-Palomares, Carlos, et al. "Smart Hybrid Materials Equipped by Nanoreservoirs of Therapeutics." ACS Nano 6.1 (2012): 483-490.

Nejadnik, Hossein, et al. "Autologous bone marrow-derived mesenchymal stem cells versus autologous chondrocyte implantation: An observational cohort study." The American Journal of Sports Medicine 38.6 (2010): 1110-1116.

Niethammer, Thomas Richard, et al. "Matrix based autologous chondrocyte implantation in children and adolescents: a match paired analysis in a follow-up over three years post-operation." International Orthopaedics 41.2 (2016): 343-350.

Nixon, A. J., et al. "A chondrocyte infiltrated collagen type I/III membrane (MACI® implant) improves cartilage healing In the equine patellofemoral joint model." Osteoarthritis and Cartilage 23.4 (2015): 648-660.

Sensebé, Luc, et al. "Biodistribution of Mesenchymal Stem/Stromal Cells in a Preclinical Setting." Stem Cells International 2013 Article 678063 (2013): 1-5.

Seo, Seogjin, et al. "Mesenchymal stem cell-based tissue engineering for chondrogenesis." Journal of Biomedicine and Biotechnology 2011 Article 806891 (2011): 1-8.

Volz, Martin, et al. "A randomized controlled trial demonstrating sustained benefit of Autologous Matrix-Induced Chondrogenesis over microfracture at five years." International Orthopaedics 41.4 (2017): 797-804.

Notice of Reasons for Refusal for corresponding Japanese application No. 2022-568430; dated Nov. 6, 2023 (8 pages) Machine Translation.

Eap, Sandy, et al. "A living thick nanofibrous implant bifunctionalized with active growth factor and stem cells for bone regeneration." International Journal of Nanomedicine (2015): 1061-1075.

COMPOSITE PRODUCT FOR THE OSTEOARTICULAR REGENERATION OF CARTILAGE LESION

The present invention concerns a composite advanced therapy medicinal product for the osteoarticular regeneration of cartilage lesion. The present invention concerns in particular a biomaterial comprising three main elements, intended in particular for the prevention and/or treatment of osteoarthritis.

The extended life expectancy and the raise of accidental trauma call for an increase of osteoarticular surgical procedures. Arthroplasty, the main clinical option to treat osteoarticular lesions, has limitations and drawbacks.

Regeneration of osteochondral defects represents a major challenge, especially considering the ageing of the population and the high impact on the public health system. The surgical procedures currently applied (bone graft, mosaicplasty, micro-fracture, articular prosthesis, therapeutic implant), are invasive and/or painful for the patient, with limited efficacy and side effects. Lesions of the femoral condyles are especially common, and can have serious consequences. A 2002 study found that 60% of patients undergoing arthroscopy showed osteochondral defects; in more than half of the cases, such a lesion was classified as grade 3 or higher, according to the International Cartilage Repair Society (ICRS) scale. Osteochondral defects do not heal properly and, even when treated (e.g. by Pridie's marrow stimulation or by mosaicplasty treatment) lead to osteoarthritis (OA) in 52% of the cases. The unique properties of the cartilage (multilayered cell structure, different extracellular matrix composition and fibril orientation) make it difficult to repair. Surgical techniques like micro-fracture, mosaicplasty, osteoarticular transplantation or autologous chondrocytes implant may allow a partial functional recovery, but are mostly aimed to relieve the pain and prevent the lesion to spread (Ho Y Y, Stanley A J, Hui J H, Wang S C. Postoperative evaluation of the knee after autologous chondrocyte implantation: what radiologists need to know. Radiographics 27, 207-220; discussion 221-202 (2007)). All these techniques have a variable outcome (Magnussen R A, Dunn W R, Carey J L, Spindler K P. Treatment of focal articular cartilage defects in the knee: a systematic review. Clin Orthop Relat Res 466, 952-962 (2008)) and intrinsic limitations (Horas U, Pelinkovic D, Herr G, Aigner T, Schnettler R. Autologous chondrocyte implantation and osteochondral cylinder transplantation in cartilage repair of the knee joint. A prospective, comparative trial. J Bone Joint Surg Am 85-A, 185-192 (2003); Bark S, Piontek T, Behrens P, Mkalaluh S, Varoga D, Gille J. Enhanced microfracture techniques in cartilage knee surgery: Fact or fiction?World J Orthop 5, 444-449 (2014)) and none was shown to restore the hyaline articular surface (Marcacci M, Filardo G, Kon E. Treatment of cartilage lesions: what works and why?Injury 44 Suppl 1, S11-15 (2013)), justifying the search for alternative therapies to promote osteoarticular regeneration (OAR). Recently, membrane-based collagen material of mammalian origin (Nixon A J, Rickey E, Butler T J, Scimeca M S, Moran N, Matthews G L. A chondrocyte infiltrated collagen type I/III membrane (MACI(R) implant) improves cartilage healing in the equine patellofemoral joint model. Osteoarthritis Cartilage 23, 648-660 (2015); Volz M, Schaumburger J, Frick H, Grifka J, Anders S. A randomized controlled trial demonstrating sustained benefit of Autologous Matrix-induced Chondrogenesis over microfracture at five years. Int Orthop 41, 797-804 (2017); 12. Niethammer T R, Holzgruber M, Gulecyuz M F, Weber P, Pietschmann M F, Muller P E. Matrix based autologous chondrocyte implantation in children and adolescents: a match paired analysis in a follow-up over three years post-operation. Int Orthop 41, 343-350 (2017); and Cengiz I F, et al. Orthopaedic regenerative tissue engineering en route to the holy grail: disequilibrium between the demand and the supply in the operating room. J Exp Orthop 5, 14 (2018)) containing pre-cultured autologous chondrocytes, was used to fill articular focal lesions and promote cartilage regeneration. However, when performed on subchondral bone, they showed site morbidity and fibrocartilage formation (Caldwell K L, Wang J. Cell-based articular cartilage repair: the link between development and regeneration. Osteoarthritis Cartilage 23, 351-362 (2015)), leading to misfunctional repair. To overcome these limitations, mesenchymal stem cell (MSCs)-based therapies emerged, which employ autologous bone marrow derived MSCs to increase the efficiency of OAR (Magne D, Vinatier C, Julien M, Weiss P, Guicheux J. Mesenchymal stem cell therapy to rebuild cartilage. Trends Mol Med 11, 519-526 (2005); Nejadnik H, Hui J H, Feng Choong E P, Tai B C, Lee E H. Autologous bone marrow-derived mesenchymal stem cells versus autologous chondrocyte implantation: an observational cohort study. Am J Sports Med 38, 1110-1116 (2010); Seo S, Na K. Mesenchymal stem cell-based tissue engineering for chondrogenesis. J Biomed Biotechnol 2011, 806891 (2011); and Beane O S, Darling E M. Isolation, characterization, and differentiation of stem cells for cartilage regeneration. Ann Biomed Eng 40, 2079-2097 (2012))). A combination of biomaterials, stem cells and active molecules are therefore needed to promote an effective tissue repair and to achieve a functional recovery of the articulation (Henkel J, et al. Bone Regeneration Based on Tissue Engineering Conceptions—A 21st Century Perspective. Bone Res 1, 216-248 (2013); and Drevelle O, Faucheux N. Biomimetic materials for controlling bone cell responses. Front Biosci (Schol Ed) 5, 369-395 (2013)).

The aim of the present invention is thus to provide a new biomaterial able to address both subchondral bone and cartilage regeneration Another aim of the present invention is to provide a biomaterial useful for the prevention of osteoarthritis.

The present invention relates to the optimisation of the synthetic patches with different functions in an implant, a wound patch and protection covering. This innovative strategy offers major advances in the field of subchondral bone and cartilage regeneration, including multi-tissue differentiation (bone/cartilage) and local, precise stimulation by growth factors in adequate dosage (nanoscale).

The present invention relates to a biomaterial comprising:
- a membrane wound patch (a), made of a nanofibrous polymeric scaffold, wherein optionally said polymeric scaffold has a surface being coated
  either with an interrupted coating made of multilayered droplets, said multilayered droplets being droplets composed of at least one layer pair consisting of a layer of polyanions including at least chondroitin sulfate and/or hyaluronic acid, and a layer of polycations, and,
  or with a continuous coating comprising more than 15 layer pairs, each layer pair consisting of a layer of polyanions including at least chondroitin sulfate and/or hyaluronic acid, and a layer of polycations;
- a hydrogel (b) including stem cells, preferably autologous or allogenic bone marrow-derived mesenchymal stem cells, and
- a bone wound patch (c) being a nanofibrous scaffold made of polymers, wherein said scaffold has a surface coated with an interrupted coating made of multilayered droplets, said multilayered droplets being droplets composed of at least one layer pair consisting of a layer of polyanions and a layer of polycations, and wherein the bone wound patch (c) further comprises a bone growth factor; wherein the hydrogel (b) is included between the membrane wound patch (a) and the bone wound patch (c).

The present invention also relates to a biomaterial comprising:

a membrane wound patch (a), made of a nanofibrous polymeric scaffold, wherein optionally said polymeric scaffold has a surface being coated either with an interrupted coating made of multilayered droplets, said multilayered droplets being droplets composed of at least one layer pair consisting of a layer of polyanions including at least chondroitin sulfate and/or hyaluronic acid, and a layer of polycations, and, or with a continuous coating comprising more than 15 layer pairs, each layer pair consisting of a layer of polyanions including at least chondroitin sulfate and/or hyaluronic acid, and a layer of polycations;

a hydrogel (b) including stem cells, and a bone wound patch (c) being a nanofibrous scaffold made of polymers, wherein said scaffold has a surface coated with an interrupted coating made of multilayered droplets, said multilayered droplets being droplets composed of at least one layer pair consisting of a layer of polyanions and a layer of polycations, and wherein the bone wound patch (c) further comprises a bone growth factor;

wherein the hydrogel (b) is included between the membrane wound patch (a) and the bone wound patch (c).

The present invention relates to a biomaterial comprising:

a membrane wound patch (a), made of a nanofibrous polymeric scaffold, wherein said polymeric scaffold has a surface being coated either with an interrupted coating made of multilayered droplets, said multilayered droplets being droplets composed of at least one layer pair consisting of a layer of polyanions including at least chondroitin sulfate and/or hyaluronic acid, and a layer of polycations, and, or with a continuous coating comprising more than 15 layer pairs, each layer pair consisting of a layer of polyanions including at least chondroitin sulfate and/or hyaluronic acid, and a layer of polycations;

a hydrogel (b) including stem cells, preferably autologous or allogenic bone marrow-derived mesenchymal stem cells, and a bone wound patch (c) being a nanofibrous scaffold made of polymers, wherein said scaffold has a surface coated with an interrupted coating made of multilayered droplets, said multilayered droplets being droplets composed of at least one layer pair consisting of a layer of polyanions and a layer of polycations, and wherein the bone wound patch (c) further comprises a bone growth factor;

wherein the hydrogel (b) is included between the membrane wound patch (a) and the bone wound patch (c).

Membrane Wound Patch (a)

Preferably, the membrane wound patch is made of a nanofibrous polymeric scaffold, wherein said polymeric scaffold has a surface being optionally coated.

Preferably, the membrane wound patch is made of a nanofibrous polymeric scaffold, wherein said polymeric scaffold has a coated surface as explained above.

The scaffold of the patch (a) is made of a polymer. Preferably, the polymer is chosen from the group consisting of: poly(ε-caprolactone), collagen, fibrin, poly(lactic acid), poly(glycolic acid), poly(ethylene glycol)-terephtalate, poly (butylenes terephtalate), or co-polymers thereof, and mixtures thereof. The scaffold of the patch (a) can also be made of polymers such as hyaluronic acid, hydroxyapatite, chondroitin sulfate, chitosan, and mixtures thereof.

According to an embodiment, the nanofibrous polymeric scaffold of the membrane wound patch (a) is made of a polymer selected from the group consisting of: polyesters, polyamides, polyurethanes and polyureas, poly(amide-enamine)s, polyanhydrides, polymers produced from microbial, vegetal, marine or animal sources, and polymer blends thereof.

More preferably, the polymeric scaffold of the membrane wound patch (a) is made of poly(ε-caprolactone) or of collagen.

Most preferably, the nanofibrous polymeric scaffold of the membrane wound patch (a) is made of poly(ε-caprolactone), optionally mixed with chondroitin sulfate and hyaluronic acid.

According to the invention, the membrane wound patch comprises cartilage components, most preferably chondroitin sulfate and hyaluronic acid. Hyaluronic acid (HA) is a polysaccharide abundant in cartilaginous matrices, which constitutes an ideal chondrogenic microenvironment, ideal for cartilage regeneration. Chondroitin sulfate is an important structural component of cartilage and provides much of its resistance to compression.

According to an embodiment, the chondroitin sulfate and/or the hyaluronic acid are included in the polymeric scaffold. In such embodiment, the scaffold is not further coated.

According to an embodiment, the chondroitin sulfate and the hyaluronic acid are included in the coating of multilayered droplets, as polyanions.

According to a preferred embodiment, the membrane wound patch (a) is made of a poly(ε-caprolactone) scaffold including chondroitin sulfate/hyaluronic acid droplets.

According to a preferred embodiment, the poly(ε-caprolactone) is preferably electrospun.

In a specific embodiment, the scaffold of the patch (a) has a surface coated with an interrupted coating of multilayered droplets. These droplets may also be named "nanoreservoirs" or "nanocontainers".

More specifically, the scaffold of the patch (a) is coated, on a layer-by-layer basis, with layers that are alternatively negatively or positively charged.

This coating allows functionalizing the scaffold with a therapeutic molecule in such a way as to create nanoreservoirs of therapeutic molecules, as explained hereafter.

The term "multilayered droplet" refers to droplets or patches composed of at least one layer pair consisting of a layer of polyanions and a layer of polycations. Said droplets can present different shapes: circle shaped, oval-shaped or scale shaped. Preferably, said droplets have a size of 10 to 150 nm, more preferably 15 to 100 nm, even more preferably 25 to 50 nm.

According to the invention, the term "multilayered droplet coating" refers to a coating of droplets or patches disposed at the surface of the scaffold and obtained by layer-by-layer (LbL) deposition of oppositely charged molecules multilayered droplet.

The term "multilayered droplet coating" further refers to an interrupted coating of the scaffold, i.e. a coating that is not in the form of a continuous film along the surface of the biomaterial scaffold. The multilayer droplet coating may be characterized by its irregular shape and/or by the fact that it does not cover the totality of the surface of the scaffold, in such a way that at least a part of the surface of the scaffold is not coated. The multilayer droplet coating of the invention may be contrasted with a film coating having a smooth surface and covering the totality of the scaffold surface.

The building of the coating is based on the layer-by-layer (LbL) deposition of oppositely charged molecules. That is to say, the coating of the scaffold of the patch (a) is made in the same manner as is made a polyelectrolyte multilayered film. The bone wound patch (a) thus comprises polyelectrolyte multilayers, in the form of numerous multilayered droplets, on the surface of the scaffold.

More specifically, the nanofibrous scaffold according to the invention is coated, on a layer-by-layer basis, with layers that are alternatively negatively or positively charged. At least one of these layers incorporates and/or consists of the therapeutic molecule. These layers form "multilayered droplet" on the surface of the nanofibrous scaffold. This coating allows functionalizing the nanofibrous scaffold with a therapeutic molecule in such a way as to create nano-reservoirs of therapeutic molecules. The term "multilayered droplet" refers to droplets or patches composed of at least one-layer pair consisting of a layer of polyanions and a layer of polycations. Said droplets can present different shapes: circle shaped, oval-shaped or scale shaped. Preferably said droplets have a size of 10 to 150 nm, more preferably 15 to 100 nm, even more preferably 25 to 50 nm.

According to a preferred embodiment, the polycations are chosen from the group consisting of: poly(lysine) polypeptides (PLL), covalently-coupled cyclodextrin-poly(lysine) (PLL-CDs), poly(arginine) polypeptides, poly(histidine) polypeptides, poly(ornithine) polypeptides, Dendri-Graft Poly-lysines (e.g. Dendri-Graft Poly-L-lysines), chitosan, and mixtures thereof.

More preferably, the polycation is chitosan.

According to a preferred embodiment, the polyanions may also include further polyanions in addition to the chondroitin sulfate and hyaluronic acid. Such further polyanions are chosen from the group consisting of: poly(glutamic acid) polypeptides (PGA), poly(aspartic acid) polypeptides, and mixtures thereof.

According to an embodiment, the coating of multilayered droplets is interrupted, said multilayered droplets being droplets composed of at least one layer pair consisting of a layer of polyanions including at least chondroitin sulfate and/or hyaluronic acid, and a layer of polycations.

The polyelectrolyte multilayers that coat the nanofibrous scaffold of the patch (a) are composed of at least one layer pair consisting of a layer of polyanions including at least chondroitin sulfate and hyaluronic acid and of a layer of polycations. They may for example comprise 1, 2, 3, 4, 5, 6, 7, 8, 9, 10, 11, 12, 13, 14, 15 or more layer pairs. Preferably, it comprises from 3 to 12 layer pairs.

The preparation of such coating is further explained below.

According to an embodiment, the polymeric scaffold of the patch (a) is coated with a continuous coating comprising more than 15 layer pairs, each layer pair consisting of a layer of polyanions including at least chondroitin sulfate and hyaluronic acid, and a layer of polycations.

Preferably, according to such embodiment, the nanofibrous scaffolds are coated with fifteen to thirty layer pairs each consisting of a layer of polyanions (including hyaluronic acid and/or chondroitin sulfate, which are negatively charged), and a layer of polycations (namely $DGL^{G5}$, which is positively charged).

The advantage of the multilayered droplet coating including hyaluronic acid or chondroitin sulfate compared with a multilayered droplet coating including BMP2 is the modification of the mechanical properties of the nanofibrous scaffold.

Consequently, the two cartilage components will give hydrophilic and viscous cartilage-like composition helping to reduce articular friction therapeutic molecules improve the mechanical resistance of scaffold and enhance the tissue regeneration through their therapeutic effect.

A preferred embodiment, the nanofibrous scaffold is preferably a coated film. The coating according to the invention is preferably, regularly spread over the nanofiber surface. Preferably the continuous coating comprising more than 15 layer pairs, each layer pair consisting of a layer of polyanions and a layer of polycations. They may for example comprise 15, 16, 17, 18, 19, 20, 21, 22, 23, 24, 25, 26, 27, 28, 29, 30 or more layer pairs. Preferably, it comprises from 15 to 30 layer pairs.

According to the invention, the term coated film refers to a coating disposed at the surface of the nanofiber and obtained by layer-by-layer (LbL) deposition of oppositely charged molecules. Due to the repartition of the surface charges of the polymer constituting the nanofiber, the first layer of polyanions or polycations form small droplets or patches adsorbed along the surface of the nanofibers. At each step of the polyanions or polycations polymer application, each droplet is covered by a new layer of polyanions or polycations polymer. The coating process cab be stopped when a film coating is observed. When the film coating is obtained, the multilayered droplet cannot be obtained any more along the surface of the coated nanofiber.

The term "continuous coating film" further refers to a continued coating of the nanofibers, i.e. a coating in the form of a continuous film along the surface of the nanofibers. The continuous coating film may be characterized by its regular shape and/or by the fact that it cover the totality of the surface of the nanofiber, in such a way that at least a part of the surface of the nanofiber is not coated. The continuous coating have a smooth surface and covering the totality of the nanofiber surface (see FIG. 5).

According to the invention, this preferred continuous coating comprises chondroitin sulfate and/or hyaluronic acid as polyanions.

The coated film provides advantageous characteristics to the nanofiber for its use as membrane wound patch. The first advantage of the film coating compared with the multilayered droplet coating is its mechanical property to secure and protect the other parts of implant. The other advantage is the combination of the slow degradability and the strong quantity of therapeutic molecule that can be applied on the nanofibrous, chondroitin sulfate and/or hyaluronic acid, which decrease the risk of inflammation and enhance the regeneration of for a long time.

In a preferred embodiment, the PCL is preferably a biphasic electrospun PCL membrane. Preferably, according to such embodiment, this membrane can be composed of random fibres covered with a layer of aligned fibres. This biphasic membrane can for example be obtained as described in the two first paragraphs of Example 1 with nanoreservoirs of CS/HA.

Hydrogel (b)

Preferably, the hydrogel (b) comprises hyaluronic acid and/or alginate.

As mentioned above, the hydrogel comprises living cells being autologous or allogenic bone marrow-derived mesenchymal stem cells. Preferably, the hydrogel comprises autologous bone marrow-derived mesenchymal stem cells. Said living cells are preferably obtained by induced pluripotent stem cells (iPSCs) technology.

In a specific embodiment, said living cells are comprised within a hydrogel (e.g. an alginate hydrogel or a collagen hydrogel) that is deposited on the bone wound patch (c) scaffold. In Hydrogels are well-known to the skilled in the art. An alginate hydrogel may for example be a mixture of alginate and hyaluronic acid (e.g. a alginate:hyaluronic acid solution (4:1), which may be prepared in a 0.15 M NaCl solution at pH 7.4).

Bone Wound Patch (c)

The scaffold of the patch (c) is made of a polymer.

Preferably, the polymer is chosen from the group consisting of: poly(ε-caprolactone), collagen, fibrin, poly(lactic acid), poly(glycolic acid), poly(ethylene glycol)-terephtalate, poly(butylenes terephtalate), or co-polymers thereof, and mixtures thereof.

According to an embodiment, the nanofibrous polymeric scaffold of the bone wound patch (c) is made of a polymer selected from the group consisting of: polyesters, polyamides, polyurethanes and polyureas, poly(amide-enamine)s, polyanhydrides, polymers produced from microbial, vegetal, marine or animal sources, and polymer blends thereof.

More preferably, the polymeric scaffold of the bone wound patch (c) is made of poly(ε-caprolactone) or of collagen.

As mentioned above, the scaffold of the patch (c) has a surface coated with an interrupted coating of multilayered droplets. These droplets may also be named "nanoreservoirs" or "nanocontainers" and are as defined above for the patch (a).

According to some embodiments, the scaffold is multilayered droplet coated.

The coating of the patch (c) is preferably irregularly spread over the scaffold surface.

More specifically, the scaffold of the patch (c) is coated, on a layer-by-layer basis, with layers that are alternatively negatively or positively charged.

This coating allows functionalizing the scaffold with a therapeutic molecule in such a way as to create nano-reservoirs of therapeutic molecules, as explained hereafter.

The term "multilayered droplet coating" further refers to an interrupted coating of the scaffold of (c), i.e. a coating that is not in the form of a continuous film along the surface of the polymeric scaffold of (c). The multilayer droplet coating may be characterized by its irregular shape and/or by the fact that it does not cover the totality of the surface of the scaffold, in such a way that at least a part of the surface of the scaffold is not coated. Such multilayer droplet coating may be contrasted with a film coating having a smooth surface and covering the totality of the scaffold surface.

The building of the coating is based on the layer-by-layer (LbL) deposition of oppositely charged molecules. That is to say, the coating of the scaffold of the patch (c) is made in the same manner as is made a polyelectrolyte multilayered film. The bone wound patch (c) thus comprises polyelectrolyte multilayers, in the form of numerous multilayered droplets, on the surface of the scaffold.

In contrast to a film coating that covers the whole scaffold surface, the multilayered droplet coating preferably only partially covers the scaffold surface. The coating according to the invention is applied layer by layer (LbL), the excess amount of polyanions or polycations is removed at each step with rinsing steps between consecutive adsorption steps. Due to the repartition of the surface charges, the first layer of polyanions or polycations form small droplets or patches adsorbed along the surface of the scaffold. At each step of the polyanions or polycations application, each droplet is covered by a new layer of polyanions or polycations. The coating process is stopped when the multilayered droplet coating is observed and before a film coating. The multilayered droplet coating provides advantageous characteristics to the scaffold, which are not observed with a film coating. When the film coating is obtained, the multilayered droplets cannot be obtained any more along the surface of the coated scaffold.

The first advantage of the multilayered droplet coating compared with the film coating or the uncoated scaffold is its irregular surface. This irregular shape improves the adherence of cells to the scaffold. Moreover, this irregular shape provides an increase of the surface of contact between the coating and cells, optimizing the exchanges between the coating and cells. Consequently, a small concentration of therapeutic molecule (if present) is needed for observing a better stimulation of cell growth.

In addition, the coating of the invention uses fewer polyanions and polycations layers than the film coating. A reduced number of layers are thus needed to obtain the multilayered droplet coating.

As further used herein, the term "polyelectrolyte multilayers" notably encompasses the multilayered droplets that coat the scaffold of the patch (c) according to the invention.

In the frame of the present specification, the term "polyelectrolyte" designates compounds that bear several electrolyte groups, in particular polymers whose repeating units carry electrolyte groups. The groups will dissociate in aqueous solutions, giving rise to polyanions or polycations, as the case may be, and making the polymers charged.

The polyelectrolyte multilayers that coat the nanofibrous scaffold of the patch (c) are composed of at least one layer pair consisting of a layer of polyanions and of a layer of polycations. They may for example comprise 1, 2, 3, 4, 5, 6, 7, 8, 9, 10, 11, 12, 13, 14, 15 or more layer pairs. Preferably, it comprises from 3 to 12 layer pairs.

Polyelectrolyte multilayers, and in particular multilayered droplet as described herein, can easily be obtained by the alternate dipping of the scaffold of the patch (c) in polyanion and polycation solutions.

As apparent to the skilled in the art, the only requirement for the choice of the polyanions and polycations is the charge of the molecule, i.e., the polyanion shall be negatively charged and the polycation shall be positively charged. The polyanions and polycations according to the invention may correspond to any type of molecule, such as e.g. a polypeptide (optionally chemically modified) or a polysaccharide (including cyclodextrins, chitosan, etc.).

According to a preferred embodiment, the polycations are chosen from the group consisting of: poly(lysine) polypeptides (PLL), covalently-coupled cyclodextrin-poly(lysine) (PLL-CDs), poly(arginine) polypeptides, poly(histidine) polypeptides, poly(ornithine) polypeptides, Dendri-Graft Poly-lysines (e.g. Dendri-Graft Poly-L-lysines), chitosan, and mixtures thereof.

More preferably, the polycation is chitosan.

According to a preferred embodiment, the polyanions are chosen from the group consisting of: poly(glutamic acid) polypeptides (PGA), poly(aspartic acid) polypeptides, and mixtures thereof.

As mentioned above, the bone wound patch (c) comprises a growth factor.

Preferably, the growth factor is selected from the group consisting of: a vascular endothelial growth factor (VEGF), a bone morphogenetic protein (BMP), such as BMP2, a transforming growth factor (TGF), a fibroblast growth factor (FGF), a nucleic acid coding therefor, and mixtures thereof.

More preferably, the bone wound patch (c) is made of a poly(ε-caprolactone) scaffold including chitosane/BMP2 droplets.

Therapeutic molecules such as growth factors can be incorporated into polyelectrolyte multilayers, as described, e.g., in WO 02/085423, WO 2006/079928, Lynn (2006 *Soft Matter* 2:269-273), Decher (1997 *Science* 277:1232-1237) and Jessel et al. (2003 *Advanced Materials* 15:692-695).

When the biomaterial according to the invention is used for bone and/or cartilage regeneration, said growth factor is most preferably selected from the group consisting of bone morphogenetic protein 2 (BMP2), bone morphogenetic protein 4 (BMP4), bone morphogenetic protein 7 (BMP7), fibroblast growth factor 1 (FGF1), fibroblast growth factor 2 (FGF2), fibroblast growth factor 4 (FGF4), fibroblast growth factor 8 (FGF8), fibroblast growth factor 9 (FGF9) and fibroblast growth factor 18 (FGF18).

In a specific embodiment, the polyelectrolyte multilayers comprise or consist of at least 1, 2, 3, 4, 5, 6, 7, 8, 9, 10, 11, 12, 13, 14, 15 or more layer pairs, each layer pair consisting of:
- a layer of polyanions comprising or consisting of the therapeutic molecule (such as e.g. a polypeptide, in particular a growth factor); and
- a layer of polycations comprising or consisting of chitosan or of a polymer of lysines (such as e.g. a poly (lysine) polypeptide (PLL) or a Dendri-Graft polylysine (DGLs)).

The present invention also relates to a method for preparing the bone wound patch (c) as defined above, said method comprising a step of coating the scaffold with at least one layer pair consisting of a layer of polyanions and a layer of polycations.

Preferably, the above-mentioned step of coating with at least one layer pair comprises the following steps:
i. immersing the scaffold in a solution comprising the polycations (e.g. during about 5 to 60 min, preferably during about 15 min);
ii. rinsing the scaffold obtained at the end of step (i) (e.g. during about 5 to 60 min, preferably during about 15 min);
iii. immersing the scaffold obtained at the end of step (ii) in a solution comprising the polyanions (e.g. during about 5 to 60 min, preferably during about 15 min);
iv. rinsing the scaffold obtained at the end of step (iii) (e.g. during about 5 to 60 min, preferably during about 15 min); and, optionally;
v. repeating step (i) to (iv) for at least a second time; and, optionally;
vi. sterilizing the scaffold obtained at the end of step (iv) or (v) (e.g. by exposure to ultraviolet light).

At step (i) and (iii), the solution comprising the polycations or polyanions may for example comprise a concentration of polycations or polyanions within a range of about 20 μM to about 500 μM, preferably of about 50 μM to about 200 μM. Said solution may for example comprise or consist of, in addition to the polyanions or polycations, 0.02 M 2-(N-morpholino)ethanesulfonic acid (MES) and 0.15M NaCl. The pH of the solution is preferably neutral (e.g. a pH of 7.4).

At step (ii) and (iv), the scaffolds may for example be rinsed with a solution having a neutral pH (e.g. a pH of 7.4). Said solution may for example comprise or consist of 0.02 M MES and 0.15 M NaCl.

Step (v) may be repeated any number of times, depending on the number of layer pairs that should coat the scaffold.

Step (vi) may for example be carried out by exposure to ultraviolet light (for example at 254 nm, 30 W, at an illumination distance of 20 cm, for about 15 min to about 1 hour, preferably for about 30 min).

Before use, the bone wound patch (c) according to the invention may be equilibrated (e.g. by bringing it in contact with serum-free medium).

As immediately apparent to the skilled in the art, the steps in which the nanofibrous scaffold is immersed in a solution comprising polycations or polyanions may be replaced with steps wherein said solution is sprayed onto the scaffold.

The hydrogel (b) as defined above may be prepared by a method comprising the following steps:
a) providing or obtaining the living cells as defined above;
b) mixing said living cells with a hydrogel (e.g. a collagen hydrogel or an alginate hydrogel); and
c) optionally depositing this mixture on the bone wound patch (c).

The present invention also relates to a method for the treatment of cartilage lesion using the biomaterial as defined above, said method comprising a step of applying the bone wound patch (c), a step of applying the hydrogel (b) and applying the membrane wound patch (a).

The present invention also relates to a biomaterial as defined above, for use in bone and/or cartilage regeneration.

The present invention also relates to a biomaterial as defined above, for use in the treatment of a bone and/or cartilage defect.

The present invention also relates to a kit for use for the treatment and/or the prevention of osteoarthritis, comprising:
- a membrane wound patch (a) as defined above;
- a hydrogel (b) as defined above, and
- a bone wound patch (c) as defined above.

The present invention also relates to a kit for use for the treatment and/or the prevention of osteoarthritis, comprising:
- a membrane wound patch (a) as defined above;
- a bone wound patch (c) as defined above;
- autologous or allogenic bone marrow-derived mesenchymal stem cells,
- a solution of hyaluronic acid and alginate, and
- a solution of calcium chloride or calcium phosphate.

The present invention also relates to a biomaterial comprising:
- a membrane wound patch (a) as defined above;
- a hydrogel (b) including autologous or allogenic bone marrow-derived mesenchymal stem cells, and
- a bone wound patch (c) as defined above,
- as a combined preparation for simultaneous, separate or sequential use in the treatment and/or the prevention of osteoarthritis.

The present invention also relates to a biomaterial comprising:
- a membrane wound patch (a) as defined above,
- autologous or allogenic bone marrow-derived mesenchymal stem cells,
- a solution of hyaluronic acid and alginate, and
- a solution of calcium chloride or calcium phosphate.

as a combined preparation for simultaneous, separate or sequential use in the treatment and/or the prevention of osteoarthritis.

The present invention also concerns ARTiCAR, an innovative implant for the treatment of osteoarticular lesions that combines two advanced therapy medicinal products for addressing both subchondral bone and cartilage regeneration.

The present invention is thus based on ARTiCAR (ARTicular CArtilage and subchondRal bone implant) combined Advanced Therapy Medicinal Products (ATMPs) for personalized OAR (FIG. 1A,B). The implant is made of i) a nanofibrous FDA-approved resorbable polymeric (Poly-ε-caprolactone: PCL) wound dressing, nano-functionalized with Bone morphogenetic factor 2 (BMP2)-nanoreservoirs for cell-contact dependent local delivery of therapeutics, and ii) autologous bone marrow-derived MSCs, encapsulated into a hyaluronic acid/alginate-based hydrogel (FIG. 1A). The nanoreservoirs technology enabled to reduce the dose of BMP2 to physiological levels, making it locally and sustainably available, and reducing the adverse effects of its massive release, e.g. from the soaked collagen sponges currently used in the clinic.

The present invention thus also concerns a biomaterial comprising:
a nanofibrous scaffold made of polymers; wherein said scaffold has a surface coated with an interrupted coating made of multilayered droplets, said multilayered droplets being droplets composed of at least one layer pair consisting of a layer of polyanions and a layer of polycations, and
a hydrogel, optionally including autologous or allogenic bone marrow-derived mesenchymal stem cells.

According to an embodiment, this biomaterial comprises:
a hydrogel (b) including autologous bone marrow-derived mesenchymal stem cells, and
a bone wound patch (c) being a nanofibrous scaffold made of polymers, wherein said scaffold has a surface coated with an interrupted coating made of multilayered droplets, said multilayered droplets being droplets composed of at least one layer pair consisting of a layer of polyanions and a layer of polycations, and wherein the bone wound patch (c) further comprises a bone growth factor,
said hydrogel (b) and said bone wound patch (c) being as defined above.

Preferably, the nanofibrous scaffold is made of poly(ε-caprolactone) or of collagen.

Preferably, the hydrogel is a hyaluronic acid/alginate-based hydrogel.

According to an embodiment, this biomaterial further comprises a therapeutic molecule within at least one multilayered droplet or forming at least one multilayered droplet when said therapeutic molecule is charged. Preferably, the therapeutic molecule is a growth factor selected from the group consisting of: a vascular endothelial growth factor (VEGF), a bone morphogenetic protein (BMP), a transforming growth factor (TGF), a fibroblast growth factor (FGF), a nucleic acid coding therefor, and mixtures thereof.

The present invention also concerns a method for the treatment of cartilage lesion using this biomaterial, said method comprising a step of nanofibrous scaffold application and a step of hydrogel application.

ARTiCAR consists of a polymeric nanofibrous bone wound dressing nano-functionalized with a growth factor to promote subchondral bone regeneration, and bone marrow mesenchymal stem cells embedded into hydrogel, for cartilage regeneration. In this work, the ARTiCAR was tested for i) the feasibility in treating osteochondral defects in a large animal model, ii) the possibility to monitor healing non-invasively and iii) the overall safety in two animal models under GLP preclinical standards. The data indicate the preclinical safety of ARTiCAR following international regulatory guidelines, which could undergo phase I clinical trial.

The safety of the ARTiCAR combined ATMPs was tested in promoting OAR in two different animal models. The results of the feasibility, toxicity and biodistribution tests, run accordingly to the international regulatory guidelines for cell therapies and medical devices and Good Laboratory Practice (GLP), proved the biosafety of the ARTiCAR combined ATMPs, which can therefore be used for phase I clinical trials as a ready-to-use, flexible implant to address both cartilage and subchondral bone regeneration.

(A) The ARTiCAR is a composite ATMP that combines an FDA-approved synthetic wound dressing and a living therapeutic made of autologous mesenchymal stem cells (MSCs), embedded in alginate/hyaluronic acid hydrogel. The wound dressing, named NanoM1-BMP2 is made of nanofibrous poly-ε-caprolactone nano-functionalized with Bone morphogenetic protein 2 and aims at subchondral bone regeneration. The cellular hydrogel aims at articular cartilage regeneration. The NanoM1-BMP2 was tested for cytotoxicity in vitro (step 1); the whole ARTiCAR was tested for acute toxicity, biodistribution and persistence in an osteochondral defect nude rat model (step 2) and for feasibility, safety, and non-invasive monitoring of the procedure (step 3) in a sheep intra-articular model. (B) The ARTiCAR aims at the simultaneous regeneration of both the articular cartilage and the subchondral bone in a one-step surgical procedure. After harvesting MSCs from patient's bone marrow, the NanoM1-BMP2 is applied in contact with the injured subchondral bone; afterwards, the MSCs mixed with the hydrogel is applied to fill the defect.

Figure 2:
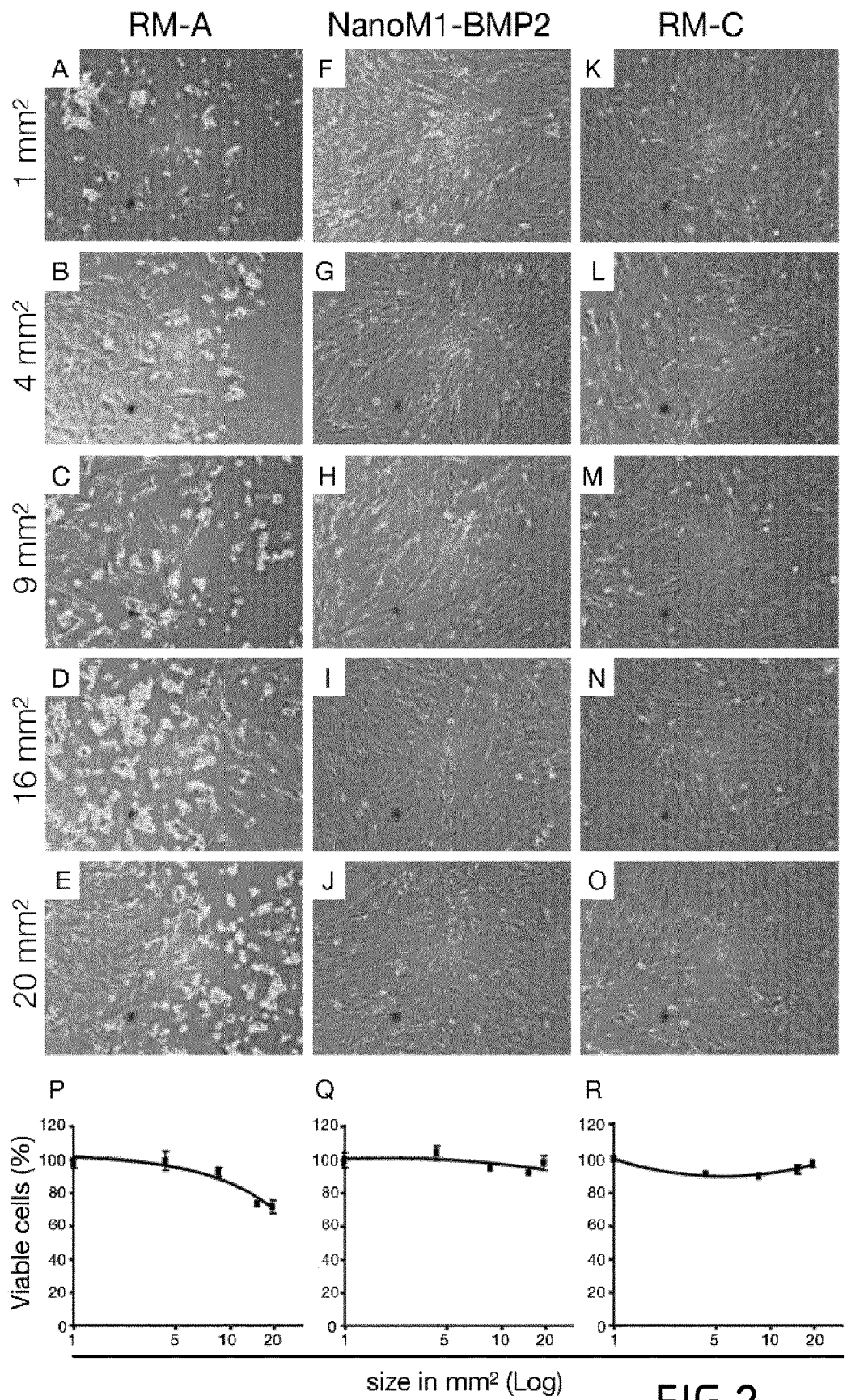

FIG. 2. In vitro evaluation of the NanoM1-BMP2 wound dressing cytotoxicity.

MRC-5 cell line was cultured in the presence of Polyurethane film, (RM-A; A-E), NanoM1-BMP2 wound dressing (F-J) or high density polyethylene film (RM-C; K-Q). Five sizes (20, 16, 9, 4, 1 $mm^2$) of membranes were used. Cells were inspected for morphological changes over a 3 day period. Proliferation/viability was assessed via WST-1 assay (P-N) at 24 hours (C.Ris Pharma, CRO, France). Scale bar: 100 μm.

Figure 3:
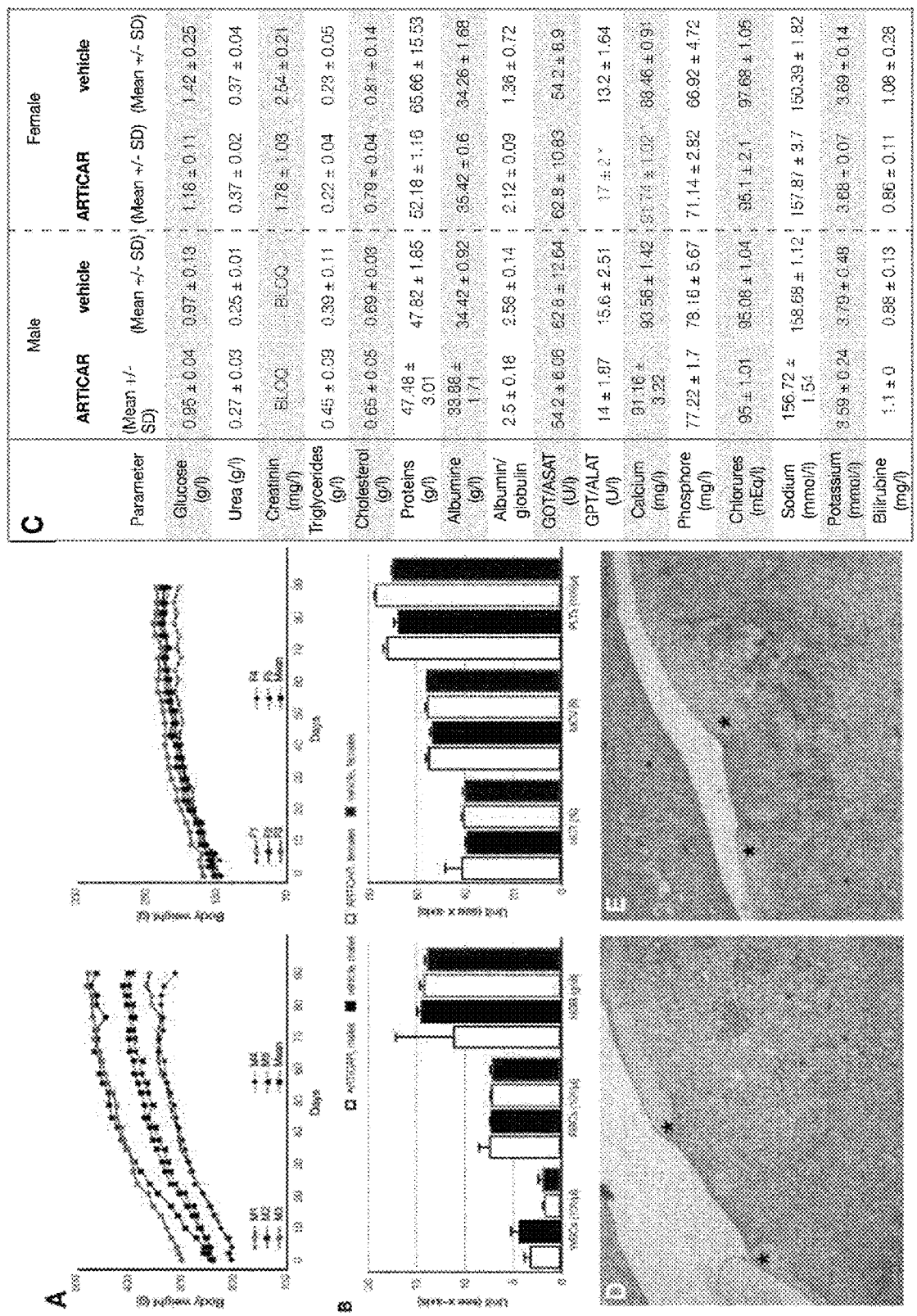

FIG. 3. clinical, hematological, biochemical and histopathology evaluation of the ARTiCAR safety in an osteochondral defect nude rat model.

(A) Individual body weight curves of 5 male (M1-M5) and 5 female (F1-F5) rats, after implant of the ARTiCAR ATMP. (B,C) Seven days after implantation, ventricular blood of implanted rats was collected (group 1: ARTiCAR, group 2: hydrogel without hMSCs; (n=20) and analyzed for haematological and biochemical parameters. WBCs: white blood cells; RBCs: red blood cells; HGB: haemoglobin; HCT: hematocrits; MCV: mean corpuscular volume; PLT: platelets. Data are presented as the mean±SD. One-way ANOVA followed by the Bonferroni post-hoc test was performed for significance. A p value ≤0.05 was considered significant. (C.Ris Pharma, CRO, France). (D,E) Histological sections of the intra-articular implant site in nude rats with femoral bone/cartilage defect, 7 days after surgery (n=20) for group 1 (D) and 2 (E), at 5× magnification. Comparable inflammatory responses involved in bone healing process and no systemic changes were observed in both group. Stars represent the limits of the defect.

Figure 4:
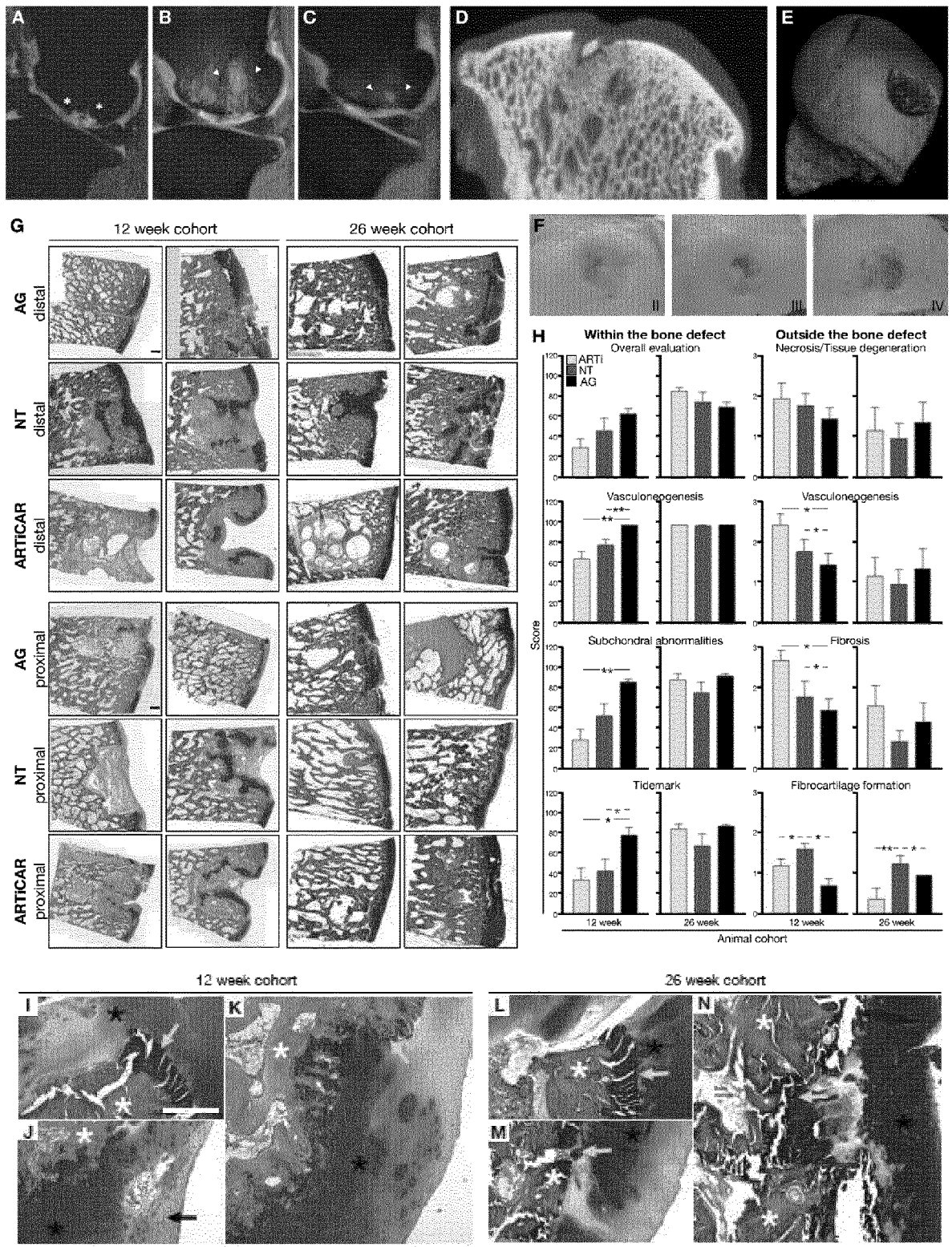

FIG. 4. Feasibility, non-invasive monitoring and safety evaluation of the ARTiCAR combined ATMPs implanted in sheep intra-articular defect model.

(A-E) the OAR process after ARTiCAR implant was monitored non-invasively by means of MRI immediately after surgery (A) and at 12 (B) and 26 (C) weeks post implant. Micro CT-scan (D) followed by 3D surface rendering (E) were performed on freshly explanted joints. (F) The level of cartilage regeneration was macroscopically assessed based on ICSR score system. (G,H) Whole explants were sectioned and stained with safranin o—fast green (blue: bone; red: cartilage), imaged at 4× and stitched together (G) to evaluate the OAR according to the ICRS II score system (G). Scale bar: 1 mm. ICRS II parameters were examined for ARTiCAR and the control groups considered and analyzed by mean of two-way ANOVA followed by Bonferroni post-hoc test (H). *=$p \leq 0.1$; **=$p \leq 0.05$. (I-N) Zones of osteochondral remodeling within the treated defects in animals from AG (I,L), NT (J,M) and ARTiCAR (K,N) groups, either at 12 or 26 weeks post implant. Bone (white asterisks), cartilage (black asterisk), fibrocartilage (black arrow) and subchondral bone (yellow arrow) are shown. Scale bar: 500 µm.

Figure 5:
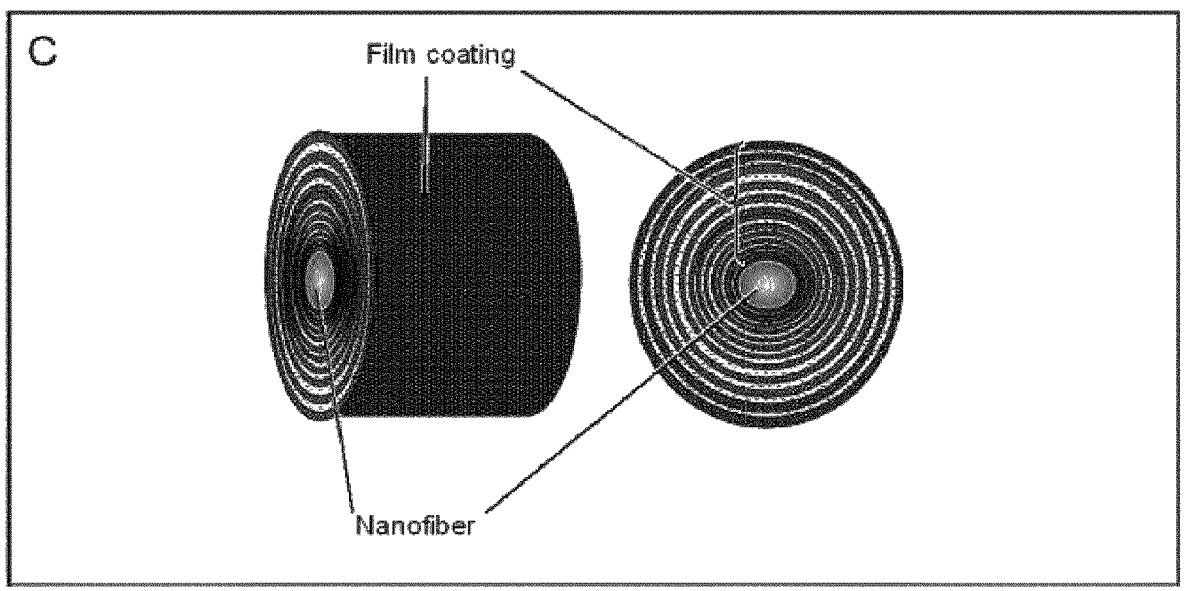

FIG. 5. A front view and a section view of schematic representations of a film-coated nanofiber.

MATERIAL AND METHODS

Chemicals

Poly(ε-caprolactone) (PCL), analytical grade, was purchased from Sigma Aldrich. PCL was dissolved in a mixture of dichloromethane/dimethylformamide (DCM/DMF 50/50 vol/vol) at 15% wt/vol and was stirred overnight before use. The Dendri Graft Poly-L-Lysines (DGLs) were purchased from COLCOM (Montpellier, France). In this study, the fifth-generation $DGL^{G5}$ has been used. Human recombinant BMP2 was purchased from PeproTech. Sodium alginate medium viscosity was from Sigma and hyaluronic acid (M.W. 132300) from Lifecore. Rat-tail type I collagen was purchased from Institut de Biotechnologies Jacques Boy. Poly(L-lysine) (PLL) was purchased from Sigma and chitosan (CHI), Protasan up CL 113, was from FMC Biopolymer (Norway). Human recombinant BMP-2 was purchased from PeproTech.

Electrospinning

Figure 1:
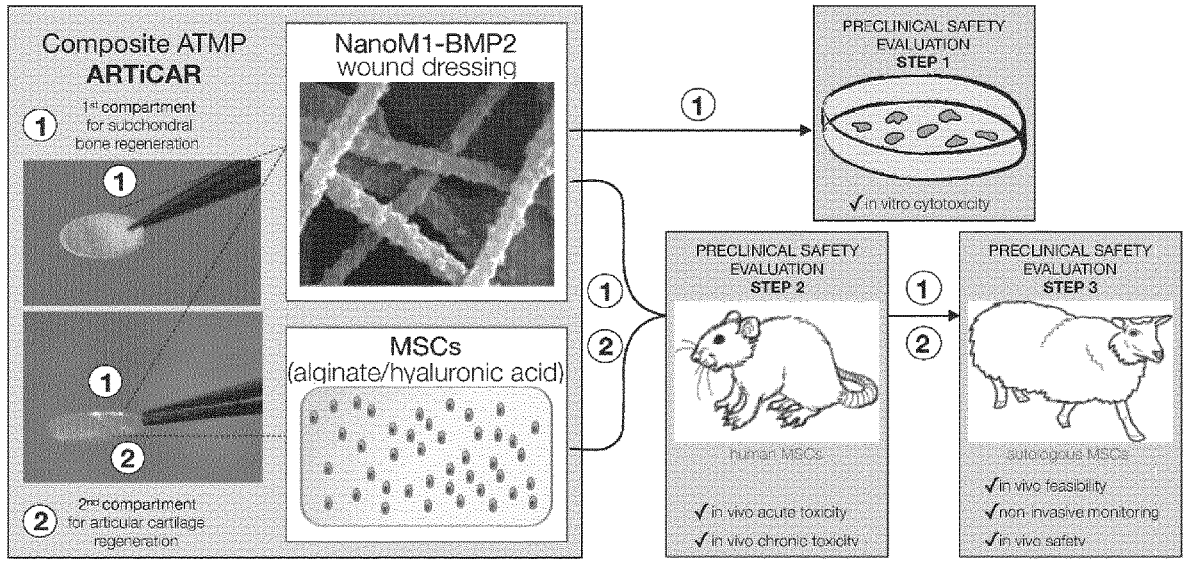
FIG. 1. Composite advanced therapy medicinal product (ATMP) developed for the osteoarticular regeneration (OAR) of cartilage focal lesions.
Figure 1:
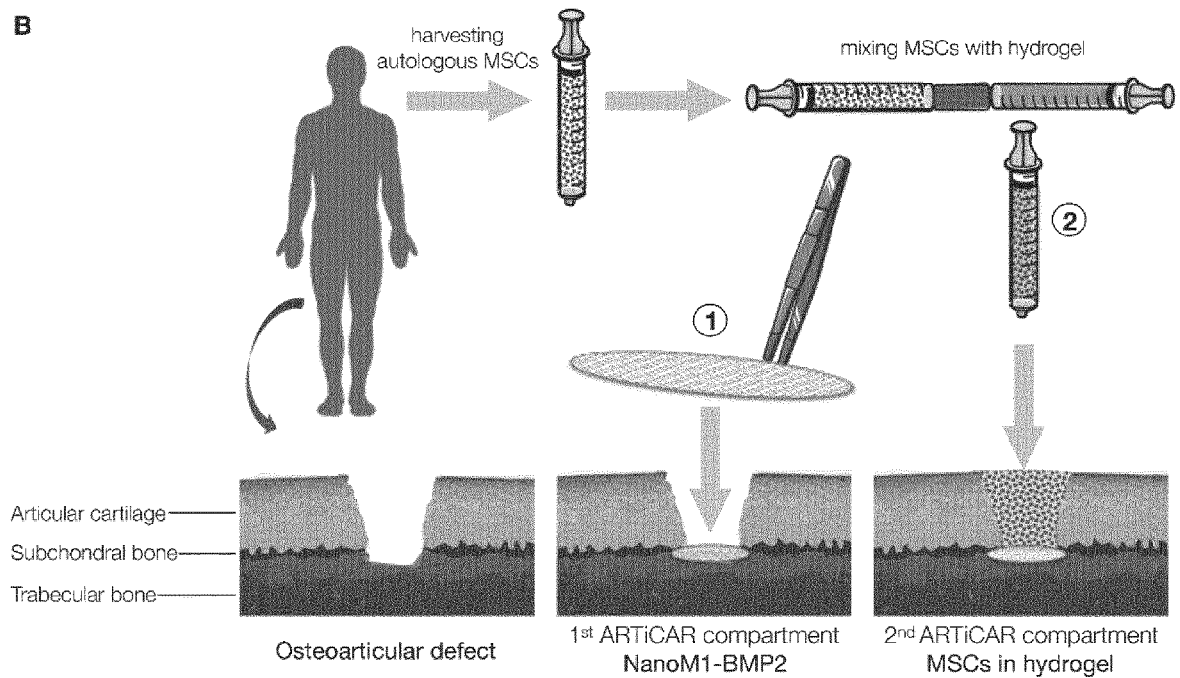

A homemade standard electrospinning set-up was used to fabricate the PCL scaffolds. The PCL solution was poured into a 5 mL syringe and ejected through a needle with a diameter of 0.5 mm at a flow rate of 1.2 ml/h, thanks to a programmable pump (Harvard Apparatus). A high-voltage power supply (SPELLMAN, SL30P10) was used to set 15 kV at the needle. Aluminum foils (20×20 cm2), connected to the ground at a distance from the needle of 17 cm, were used to collect the electrospun PCL scaffold. The collected scaffold comprise uniform randomly oriented fibres (Li et al, FIG. 1, Biomaterials, Volume 26, Issue 6, February 2005, Pages 599-609).

A second method comprises the use of polycaprolactone (PCL) solution (5% w/w), loaded into a 2 mL plastic syringe with an 18G needle and fed at a constant rate of 0.5 mL/h using a syringe pump. A positive voltage of 10 kV was applied to the needle using a high-voltage power supply. The distance between the collector and the needle tip was set at 15 cm. A rotating disk was used as the collector of electrospun fibrous scaffolds. A high rotating speed (1 000 to 3 000 rpm) was used for fabricating scaffolds composed of aligned fibres, while a low rotating speed (200-800 rpm) was used for collecting scaffolds with randomly oriented fibres. The scaffolds were vacuum dried overnight prior to subsequent experiments.

Polyelectrolyte Multilayers Preparation

Preparation of the coating of the scaffold of patch (c) For all biological activity experiments, polyelectrolyte multilayers were prepared on Electrospun PCL membrane. Multilayers constituted by ($DGL^{G5}$-BMP2)n or (PLL-BMP2)n or (CHI-BMP2)n were built by alternating immersion of the surfaces during 15 min in the respective solutions (300 µl) at the respective concentrations of 50 µM for $DGL^{G5}$ or PLL or CHI and 200 nM of BMP2 in presence of 0.02 M MES and 0.15M NaCl at pH=7.4. After each deposition step the membranes were rinsed during 15 min with 0.02 M MES and 0.15M NaCl at pH=7.4. All the membranes were sterilized for 30 min by exposure to ultraviolet (UV) light (254 nm, 30 W, illumination distance 20 cm). Before use, all membranes were equilibrated in contact with 1 ml of serum-free medium (see Cell culture).

In addition, polyelectrolyte multilayers on a Bio-Gide® resorbable collagen membrane (Geistlich Pharma AG, Germany), instead of an Electrospun PCL membrane, were also built.

Preparation of the Discontinuous Coating of the Scaffold of Patch (a)

For all biological activity experiments, polyelectrolyte multilayers were prepared on Electrospun PCL membrane. Multilayers constituted by ($DGL^{G5}$-CS/HA)n or (PLL-CS/HA)n or (CHI-CS/HA)n were built by alternating immersion of the surfaces during 15 min in the respective solutions (300 µl) at the respective concentrations of 50 µM for $DGL^{G5}$ or PLL or CHI and 200 nM of a mix of Chondroitin sulfate and hyaluronic acid in presence of 0.02 M MES and 0.15M NaCl at pH=7.4. After each deposition step the membranes were rinsed during 15 min with 0.02 M MES and 0.15M NaCl at pH=7.4. All the membranes were sterilized for 30 min by exposure to ultraviolet (UV) light (254 nm, 30 W, illumination distance 20 cm). Before use, all membranes were equilibrated in contact with 1 ml of serum-free medium (see Cell culture).

In addition, polyelectrolyte multilayers on a Bio-Gide© resorbable collagen membrane (Geistlich Pharma AG, Germany), instead of an Electrospun PCL membrane, were also built.

Preparation of the Continuous Coating of the Scaffold of Patch (a)

For all biological activity experiments, polyelectrolyte multilayers were prepared on Electrospun PCL membrane. Multilayers constituted by ($DGL^{G5}$-CS/HA)n or (PLL-CS/HA)n or (CHI-CS/HA)n were built by alternating immersion of the surfaces during 15 min in the respective solutions (300 µl) at the respective concentrations of 50 µM for $DGL^{G5}$ or PLL or CHI and 200 nM of of a mix of Chondroitin sulfate and hyaluronic acid in presence of 0.02 M MES and 0.15M NaCl at pH=7.4. After each deposition step the membranes were rinsed during 15 min with 0.02 M MES and 0.15M NaCl at pH=7.4.

The deposition steps were made until the fiber surface was fully covered by a uniform polyelectrolyte coating, without any multilayered droplets. At least 15 bilayers were deposited on fiber with at least 30 deposition steps.

All the membranes were sterilized for 30 min by exposure to ultraviolet (UV) light (254 nm, 30 W, illumination distance 20 cm). Before use, all membranes were equilibrated in contact with 1 ml of serum-free medium (see Cell culture).

Cells Culture

Human primary osteoblasts (HOB) were obtain from Cell Applications and cultured in Dulbecco's modified Eagle's medium (D-MEM®) containing 50 U/mL penicillin, 50 µg/mL streptomycin, 2.5 µg/mL Amphotericin B and 10% FBS (Life Technologies, Paisley, UK). The cultures were incubated at 37° C. in a humidified atmosphere of 5% CO2. When the cells reached sub-confluence, they were harvested with trypsin and sub-cultured.

The MSCs harvested from iliac crest were isolated according to their adherence to cell culture plastic. Bone marrow aspirates were first washed by addition of an equal volume of phosphate buffer saline (PBS; Sigma-Aldrich, France) and centrifuged at 220×g for 5 min. The cell pellets were suspended in Dulbecco's Modified Eagle Medium (DMEM; Lonza, Germany) containing 10% heat-inactivated fetal bovine serum (Gibco, Thermo Fisher Scientific, France), 50 U/mL of penicillin (Lonza, Germany), 50 µg/mL of streptomycin (Lonza, Germany), 2.5 µg/mL Fungizone (Lonza, Germany), and seeded in a T75 culture flasks, under standard cell culture conditions. The following day, medium was discarded and attached cells were gently washed up several times with PBS to remove non-adherent cells. Flasks were then incubated for several days in DMEM, replaced every 72 h to promote emergence of colonies from adherent cells. When cells finally reached sub-confluence, they were sub-cultured until passage 2, when they were expanded for stemness characterization.

Implant Type 2 and Type 3 Preparation $5 \times 10^4$ human osteoblasts were seeded and incubated for 72 h prior to gel preparation. For the collagen lattices preparation, 3 ml of Rat Tail Type-I Collagen (Institut de Biotechnologies Jacques Boy) were mixed with 5.5 ml of medium containing 10% FBS, 0.5 mL of a 0.1 M NaOH solution and 1 ml of cell suspension at 2×105 cells/ml. 0.5 mL of the cells suspension: collagen preparation were poured on the top of the electrospinned membrane and allow to polymerize by incubating it at 37° C. for 30 min. After polymerization, 0.5 ml of a human chondrocyte suspension (1×105 cells/ml) in an alginate hyaluronic acid solution (4:1) prepared in 0.15 M NaCl, pH 7.4 were poured on the top of the collagen lattice in order to obtain the 3-layered construct. 5 mm or 2 mm cylinders were cute using an sterile biopsy punch and incubated o/n at 37° C. in a humidified atmosphere of 5% $CO_2$ prior to in vivo experiments.

Cell Viability and Proliferation

Cell viability was determined by trypan blue exclusion. AlamarBlue® (Serotec) was used to assess cellular proliferation. The Alamar Blue test is a non-toxic, water-soluble, colorimetric redox indicator that changes color in response to cell metabolism. In this study, $2 \times 10^4$ human osteoblasts were seeded on the top of LbL-coated 14 mm-diameter membranes (n=3) placed on 24-well plates. After 2 days of culture, cells were incubated in 10% AlamarBlue/DMEM solution in a humidified atmosphere at 37° C. and 5% CO2. After 4 hours, 100 mL of incubation media was transferred to 96-well plates and measured at 590 nm and 630 nm in order to determine the percentage of AlamarBlue reduction.

Study Design:

All the experiments in this study were planned and performed according to the international regulatory guidelines for cell therapies and medical devices. Good Laboratory Practice and Standard Operating Procedures (SOPs) for all protocols were used. In vitro cytotoxicity assay was done according to ISO 10993-5 (2009 and 2012) guidelines. Assessment of the OAR was done in accordance to the ICRS II score system.

Production of the Nanofibrous Compartment of the Articar (Corresponding to the Bone Wound Patch (c))

The nanofibrous component of ARTiCAR was obtained via electrospinning of PCL, as previously described (Mendoza-Palomares C, et al. Smart hybrid materials equipped by nanoreservoirs of therapeutics. ACS Nano 6, 483-490 (2012)). Briefly, PCL (PURASORB®, PURAC, Corbion, Amsterdam, Netherlands) was dissolved in a 25% (wt/vol) dimethylformamide/dichloromethane solution (3/2, v/v) and delivered at a constant rate of 1 ml/h to the EC-DIG electrospinning device (IME Technologies, Eindhoven, Netherlands), set to at high voltage (20+/−3 kV). Following electrospinning, PCL membranes were kept in a desiccator at 45° C., to remove residual solvents, and sterilised by gamma irradiations (25 kGy). Membranes were then dipped alternately in 200 µg/ml BMP2 solution (rh-BMP2, Inductos, Medtronic, France) in 40 mM 4-Morpholinoethanesulfonic acid (Sigma-Aldrich, Saint-Quentin Fallavier, France), 150 mM Sodium Chloride (Sigma-Aldrich), pH 5.5 (MES buffer) and 0.5 mg/ml Chitosan (Protasan UP CL 113, Novamatrix, Sandvika, Norway), for 12 times. Each bath was followed by 3 washes in MES buffer.

Production of the Hydrogel Compartment of the Articar

Twelve mg/ml sodium alginate (Sigma-Aldrich) and 3 mg/ml hyaluronic acid (Lifecore Biomedical, Chaska, USA) were dissolved in 9 mg/ml Sodium Chloride (Sigma-Aldrich). Prior to implant, the hydrogel (b) was mixed with either human or sheep MSCs. After the MSC/hydrogel compartment was applied to fill the defect, gelation was achieved using 102 mM calcium chloride (Sigma-Aldrich).

Cell Culture

The MSCs harvested from iliac crest were isolated according to their adherence to cell culture plastic. Bone marrow aspirates were first washed by addition of an equal volume of phosphate buffer saline (PBS; Sigma-Aldrich, France) and centrifuged at 220×g for 5 min. The cell pellets were suspended in Dulbecco's Modified Eagle Medium (DMEM; Lonza, Germany) containing 10% heat-inactivated fetal bovine serum (Gibco, Thermo Fisher Scientific, France), 50 U/mL of penicillin (Lonza, Germany), 50 µg/mL of streptomycin (Lonza, Germany), 2.5 µg/mL Fungizone (Lonza, Germany), and seeded in a T75 culture flasks, under standard cell culture conditions. The following day, medium was discarded and attached cells were gently washed up several times with PBS to remove non-adherent cells. Flasks were then incubated for several days in DMEM, replaced every 72 h to promote emergence of colonies from adherent cells. When cells finally reached sub-confluence, they were sub-cultured until passage 2, when they were expanded for stemness characterization.

Cytotoxicity Assessment In Vitro

MRC5 cells were plated into 24-well plates. The NanoM1-BMP2 wound dressing was tested side by side with polyurethane film containing 0.1% zinc diethyldithiocarbamate (known for inducing cytotoxic effects; Hatano Research Institute/Food and Drug Safety Center, Japan) and high density polyethylene film (negative control; Hatano Research Institute). To assess cytotoxicity, pieces of different size (20 mm², 16 mm², 9 mm², 4 mm², 1 mm²) were placed in contact to the cultured cells, when 70-80% confluence was reached. Cells were cultured in the presence of the membranes for 3 days before being examined microscopically for changes in the general morphology, presence of vacuolization, detachment, lysis and membrane integrity, following the criteria for the qualitative evaluation of cytotoxicity according to ISO 10993 guidelines, part 5 (2009) and part 12 (2012): Class 0, no reactivity (no effects around or below sample); Class 1, slight reactivity (few malformed or degenerated cells); Class 2, mild reactivity (small area of malformed or degenerated cells below the sample); Class 3, moderate reactivity (malformed or degenerated cells in an area larger than the size of the sample but 1 cm2); Class 4, severe reactivity (malformed or degenerated cells in an area larger than the size of the sample but >1 cm2). A grade higher than 2 was considered as cytotoxic.

Quantitative Cell Viability Assay

As a quantitative measure of cytotoxicity, cell viability was evaluated. At day 3, membranes were discarded, cells were washed twice with PBS, fed with 1 ml culture medium and 100 µl/well of Cell Viability Reagent WST-1 (Lonza) was added to each well, according to internal SOPs. The cells were incubated for 3 h at 37° C. in 5% $CO_2$, and 100 µl of supernatant were transferred into a 96-well plate. Absorbance was measured at 450 and 620 nm in a Multiskan EX device (Thermo Fisher Scientific, Graffenstaden, France). Data analysis was performed with Ascent 2.6 (Thermo Fisher Scientific). Results were expressed as percentage of viable cells in respect to a blank control. A decrease of 30% viability was considered as cytotoxic.

Experiments with Animals

Animal experiments were performed according to the ethical guidelines for animal experiments. The protocols used, included in the project "Toxicologie Reglementaire", was authorized by the "Ministare de l'Enseignement superieur et de la Recherche" No. 01191.02. Seven-weeks old rats were maintained for at least 5 days in Specific Pathogen Free rooms (authorized by the French Ministries of Agriculture and Research; agreement No. A35 288-1) before the beginning of the study, according to internal SOPs, under controlled conditions of temperature (22±3° C.), humidity (50±20%), photoperiod (12 h light/12 h dark) and air exchange, according to internal SOPs. Animals were housed in standard-size polycarbonate cages (with filter lid), and bedding was replaced twice a week.

Intra-Articular Implant of Articar in Nude Rats

Evaluation of acute toxicity in vivo was achieved via intra-articular implant of ARTiCAR in a model of induced osteochondral defect in RH-Foxn1 mu/mu nude rats (Harlan, Gannat, France). Briefly, sterile NanoM1-BMP2 were rinsed in sterile PBS and cut into quarters (1.77 mm²) before implant. Subconfluent human bone marrow MSCs (Promocell, Heidelberg, Germany) were washed and resuspended in hyaluronic acid/alginate mixture to a concentration of 3.0× 107 cells/ml, as previously published (Keller L, et al. Bi-layered nano active implant with hybrid stem cell microtissues for tuned cartilage hypertrophy. Journal of Stem Cell Research & Therapeutics 1, 9 (2015); and Keller L, Wagner Q, Schwinte P, Benkirane-Jessel N. Double compartmented and hybrid implant outfitted with well-organized 3D stem cells for osteochondral regenerative nanomedicine. Nanomedicine (Lond) 10, 2833-2845 (2015)). Prior to implant, rats were anesthetized with intraperitoneal injection of a solution of 70 mg/kg ketamine and 10 mg/kg xylazine. After shaving and disinfection of right hind leg, round 1.5 mm osteochondral defects were induced with a short drill in the patellar groove of the femur, in the midline of the femoral trochlea, until bleeding of the subchondral bone (approx. 2 mm). The NanoM1-BMP2 membrane was placed at the bottom of the defect, which was in turn filled with hMSCs/ hydrogel mix and gelled via drop-wise addition of 102 mM calcium chloride (Sigma-Aldrich), over 5 minutes. These rats constituted experimental group 1 (ARTiCAR; n=20 rats; 10 males and 10 females; 3.5 µl of hydrogel containing 105,000±10% cells). Other rats were subject to the same procedure, but implanted with hydrogel only (as vehicle) and constituted group 2 (n=20 rats; 10 males and 10 females; 3.5 µl of hydrogel). After gelation, the articulation capsule was closed, muscle and skin were sutured and the wound was thoroughly disinfected with povidone-iodine solution. After surgery, rats were kept under observation for post-anaesthesia recovery. After recovery, 0.05-0.1 mg/kg buprenorphine was administered by subcutaneous injection. Animals were allowed unrestricted movement for the duration of the study (90 days). Rats were monitored daily for wound healing, leg mobility, morbidity, mortality and evident sign of toxicity.

Blood Analysis

At day 7 post implant, 5 male and 5 female fasted rats/group (n=20) were anesthetized with excess isoflurane and ventricular blood was collected either in EDTA-containing tubes or in heparin-containing tubes, for haematological or biochemical analysis, respectively. Between day 7 and 90, the remaining rats were observed and monitored twice a week for any loss of weight. Haematocrit, haemoglobin concentration, erythrocyte count, leukocyte counts, mean corpuscular volume and platelet count were determined in the blood samples on the day of collection by impedance variation and photometry (MINDRAY BC 2800 haematology analyser, 4M, France). For biochemistry evaluation, plasma samples were prepared according to internal SOPs. Sodium, potassium, chloride, calcium, inorganic phosphate, glucose, urea, creatinine, total bilirubin, total cholesterol, triglycerides, aspartate aminotransferase (ASAT), alanine aminotransferase (ALAT), total proteins, albumin, and albumin/globulin ratio were quantified (Cobas Mira biochemistry analyser, 4M, France).

Histopathology Analysis of Nude Rats Implants

Histopathology analysis was conducted on the fasted animals used for blood test. Briefly, a macroscopic autopsy was performed on freshly euthanized rats. Organs (treated knee, spleen, mesenteric lymph nodes, liver, lungs with bronchi and bronchiole, kidneys and heart) were macroscopically observed, explanted and collected. The right hind paw was sectioned at the epiphyses of both femur and tibia to recover knee joints subject to implant. Spleen, liver, kidneys and heart were weighed and preserved with the other organs at room temperature in 4% formalin (Sigma-Aldrich) until histological analyses. Organs were fixed in 4% paraformaldehyde, dehydrated, embedded in paraffin, sectioned and examined for histopathology.

Tissue Harvesting for Human DNA QPCR

Ninety days post implant, 5 male and 5 female rats/group (n=20) were euthanized by exsanguination under anaesthesia. After a macroscopic autopsy organs (ovaries with oviducts, testes, brain, treated knee, spleen, liver, kidneys, lungs, bone marrow, heart and the skin covering the treated knee joint) were weighed and collected for DNA extraction using the NucleoBond AXG100 kit (Macherey Nagel, Hoerdt, France), following manufacturer's instructions. Briefly, all tissue samples except knee joints were homogenized in M-tubes (Miltenyi Biotec, Paris, France) containing buffer G2 on a GentleMACS Dissociator (Miltenyi Biotec, Paris, France). Knee joints were homogenized using Ultra-Turrax® dissociator instrument in buffer G2. Following extraction, the DNA pellet was dissolved in molecular biology grade water, and stored at 20° C. Quantitative PCR (qPCR) with the iTaq Universal Probes Supermix (BioRad, Marnes-la-Coquette, France) was used to quantify human Alu sequences with the TaqMan AluYB8 Probe (Thermo Fischer Scientific). Genomic DNA from the different tissues of the implanted rats was amplified side-by-side with DNA from control rats, spiked-in with variable amount of DNA from U87-MG human cells (22, 7, 0.7 ng; 70, 7, 2.2, 0.7, 0.07 μg or no DNA), to build a standard curve. Samples were run in triplicate for 35 cycles on a CFX System (Bio-Rad). The limit of detection corresponded to the average signal from control rat DNA not spiked-in with human DNA.

Harvesting of MSCS from Sheep Bone Marrow

Four weeks (28±2 days) prior to interarticular surgery, adult sheep females (Rideau Arcott Hybrids strain) were subject to bone marrow aspiration procedure. Briefly, animals were placed in ventral recumbency and anesthetized with a mix of glycopyrolate, xylazine and ketamine administered intramuscularly (IM). An IV catheter was placed in the appropriate vein. The larynx was sprayed with lidocaine and the animals were intubated with an appropriate sized cuffed orotracheal tube. If intubation was not possible under IM anaesthesia, induction was performed using isoflurane in $O_2$ (1-5%) or propofol intravenously. The sheep were then mechanically ventilated with isoflurane in $O_2$. The harvest site was disinfected and a needle was introduced in the iliac crest. A sterile 10 mL syringe was filled with 1 mL of 5,000 IU/mL heparin and filled with approximately 8 mL of bone marrow. The syringe containing bone marrow sample and heparin was sealed with an appropriate sterile cap for mesenchymal stem cells isolation, characterization and preparation for the surgical procedure.

Induction of Osteochondral Defect in Sheep

A total of 16 adult sheep underwent surgical induction of osteochondral defect into the medial femoral condyle. Three groups of sheep (ARTiCAR, AG control, NT control) were considered; each sheep was implanted on either the proximal or distal part of the right or left condyle of posterior legs. For surgery, the hind limb was flexed to a position at which the medial condyle could be palpated under the skin. A 15 cm medial parapatellar skin incision was performed. After blunt dissection of the subcutaneous tissues, the fascia overlying the vastus medialis muscle was incised just distal to the belly muscle with a small incision parallel to the muscle fibers and the vastus was retracted proximally. Blunt dissection was used to expose the periosteum down to the medial condyle of the femur. The joint capsule and periosteum were incised just proximal to the origin of the medial collateral ligament. Overlying soft tissues were removed from the bone only in the vicinity of the drill holes. Holes were predrilled using a 6-mm drill bit to a depth of 3 mm, except for the AG group, where the hole had a depth of 6 mm.

Intra-Articular Implant of Articar in Sheep

Following the induction of the defect, the NanoM1=BMP2 was placed, and the defect was filled with MSCs/hydrogel mix (ARTiCAR combined ATMPs, n=9). In the AG group (n=10), a bone sample of 6 mm of diameter and 6 mm deep was taken out from the condyle and placed into the defect. In the NT group (n=13) the defect was neither treated, nor filled. Up to 5 mL 0.25% bupivacaine were infiltrated into the surgical site to achieve local anaesthesia and manage pain after surgery. The tissues were repositioned and closed layer-by-layer using appropriate sutures. Postoperative analgesia and antibiotic therapy were performed, 5 mg/kg Excede (IM) was administered during recovery from anaesthesia, and 4 mg/kg caprofen (IM) was administered 3 days after surgery.

Non-Invasive Monitoring of Articar Implant Via MRI

For the longitudinal analysis of the knee repair, sheep were examined three times via MRI, immediately after surgery, at 15 and 26 weeks, using a Magnetom Verio 3T (Siemens). For the procedure, sheep were anaesthetised with an intravenous injection of 0.05 mg/kg xylazine and 5 mg/Kg ketamine and placed in dorsal decubitus. A total of six sites of surgery were imaged for each group. Proton density weighted, fat-saturated sagittal sections of the acquisitions were analysed using the Osirix opensource software.

Three-Dimensional Micro-Ct of Explanted Femoral Condyles

For analysis of the bone mineralization, sheep were anesthetized, weighed and euthanised by a lethal injection of 540 mg/ml Euthanyl rapid IV bolus 26 weeks after surgery. Death was confirmed and recorded by observation of asystole or ventricular fibrillation, either on the electrocardiogram or by auscultation. Femoral condyle from were explanted from euthanized sheep and imaged via 3D micro-CT (Quantum Fx mCT, Julien Becker, ICS, IGBMC, Strasbourg, France). A total of six sites of surgery were imaged for each group. Three-dimensional surface rendering was obtained from micro-CT 2D images using the Osirix opensource software.

Histopathology Analysis of Implants in Sheep

Treated femurs were removed from euthanized animals and subject to macroscopic inspection of the articular surface. The distal femoral epiphysis (with condyles) were individually identified and collected in 10% neutral buffered formalin, after macroscopic examination. Bone blocks were cut in two halves, by sawing in the middle of the sample along its longitudinal axis. Sections were cut through the defect along its deeper axis, from the bone surface to the end of the drill hole producing rectangular-shaped defect half sections. Full-thickness femoral bone-cartilage defect sites underwent undecalcified bone preparation and were infiltrated with methylmethacrylate and polymerized. A single 8 μm section spanning the entire width of the defect was cut along the parasagittal plane from each medial femoral condyle. The sections were stained with safranin o—fast green, for the staining of both cartilage and bone. The femoral defect sites were carefully evaluated and scored according to the ICRS histological score system according to the below Table:

TABLE 1

| ICRS II parameters for the evaluation of OAR within the implant site | | | | | |
|---|---|---|---|---|---|
| ICRSII parameters | | ARTCAR | Defect | Autograft | p-value |
| Tissue morphobrgy | 12 W | 46 ± 26 | 62 ± 30 | 98 ± 3 | 0.092 |
| 0%: Full thickness fibers/100%: Normal cartilage birefringence | 26 W | 99 ± 2 | 96 ± 9 | 100 ± 0 | 0.411 |
| Matrix staining | 12 W | 41 ± 27 | 55 ± 36 | 59 ± 25 | 0.855 |

TABLE 1-continued

ICRS II parameters for the evaluation of OAR within the implant site

| ICRSII parameters | | ARTCAR | Defect | Autograft | p-value |
|---|---|---|---|---|---|
| 0%: No staining/100%: Full metachromasia | 26 W | 96 ± 5 | 82 ± 25 | 76 ± 24 | 0.338 |
| Cell morphology | 12 W | 55 ± 19 | 61 ± 32 | 98 ± 3 | 0.190 |
| 0%: No round/oval cells/100%: Mostly round/oval cells | 26 W | 98 ± 4 | 96 ± 6 | 99 ± 2 | 0.286 |
| Surface architecture | 12 W | 34 ± 12 | 36 ± 16 | 40 ± 18 | 0.870 |
| 0%: Delamination, or major irregularity/100%: Smooth surface | 26 W | 69 ± 22 | 68 ± 29 | 61 ± 16 | 0.464 |
| Basal integration | 12 W | 43 ± 25 | 51 ± 33 | 89 ± 8 | 0.055 |
| 0%: No integration/100% Complete integration | 26 W | 94 ± 8 | 76 ± 31 | 93 ± 4 | 0.386 |
| Formation of a tidemark | 12 W | 35 ± 24 | 44 ± 30 | 90 ± 16 | 0.096 |
| 0%: No calcification front/ 100%: Tidemark | 26 W | 86 ± 11 | 69 ± 33 | 89 ± 4 | 0.214 |
| Subchondral bone abnormalities/ marrow fibrosis | 12 W | 30 ± 22* | 54 ± 30 | 88 ± 6 | 0.001 |
| 0%: Abnormal/100%: Normal marrow | 26 W | 90 ± 14 | 77 ± 29 | 94 ± 6 | 0.343 |
| Vascularization (within the repaired tissue) | 12 W | 66 ± 16 | 80 ± 14 | 100 ± 0 | 0.080 |
| 0% Present/100% Absent | 26 W | 100 ± 0 | 99 ± 2 | 100 ± 0 | 0.686 |
| Surface/superficial assessment | 12 W | 46 ± 11 | 45 ± 29 | 50 ± 43 | 0.852 |
| 0%: Total loss of compete disruption/100%: Resembles intact articular camitage | 26 W | 87 ± 9 | 80 ± 25 | 66 ± 16 | 0.275 |
| Mid/deep zone assessment | 12 W | 31 ± 18 | 50 ± 35 | 63 ± 10 | 0.318 |
| 0% Fibrous tissue/100% normal hyaline cartilage | 26 W | 90 ± 8 | 76 ± 28 | 77 ± 12 | 0.161 |
| Overall assessment | 12 W | 31 ± 18 | 48 ± 32 | 65 ± 11 | 0.311 |
| 0%: Bad (fibrous tissue)/100% Good (hyaline cartilage) | 26 W | 88 ± 8 | 77 ± 27 | 72 ± 13 | 0.139 |

After either 12 or 26 weeks from implant, safety parameters were evaluated for ARTiCAR (n=4-7 at 12 weeks; n=4-7 at 26 weeks) and compared to autograft (n=4 at 12 weeks; n=6 at 26 weeks) treatment (comparable to mosaicplasty currently performed for cartilage treatment in surgery) and to no treatment (n=6 at 12 weeks; n=7 at 26 weeks). Values are represented as mean±SD. Differences were evaluated with One-Way ANOVA/Kruskal-Wallis test. *=p 0.05 between ARTiCAR and autograft.

Also, the tissue underneath and adjacent to the defect was evaluated for a number of parameters (see below table 2) to assess safety and efficacy of the treatments.

TABLE 2

Parameters for the evaluation of tissues adjacent to implant site

| Histological calls evaluation for Cell Typo/Response | | ARTICAR | Defect | Autograft |
|---|---|---|---|---|
| Polymorphonuclear cells | 12 W | 0.00 ± 0.00 | 0.00 ± 0.00 | 0.00 ± 0.00 |
| 0: 0/1: Rare. 1-5/phf*/2: 6-10/phf*/3: Heavy infiltrate/ 4: Packed Lymphocytes | 26 W | 0.00 ± 0.00 | 0.00 ± 0.00 | 0.00 ± 0.00 |
| | 12 W | 1.00 ± 0.00 | 1.00 ± 0.00 | 0.00 ± 0.00 |
| 0: 0/1: Rare. 1-5/phf*/2: 6-10/phf*/3: Heavy infiltrate/ 4: Packed Plasma calls | 26 W | 0.20 ± 0.45 | 0.14 ± 0.38 | 0.60 ± 0.55 |
| | 12 W | 0.50 ± 0.58 | 0.00 ± 0.00 | 0.00 ± 0.00 |
| 0: 0/1: Rare. 1-5/phf*/2: 6-10/phf*/3: Heavy infiltrate/ 4: Packed Macrophages | 26 W | 0.20 ± 0.45 | 0.29 ± 0.49 | 0.20 ± 0.45 |
| | 12 W | 1.00 ± 0.00 | 1.00 ± 0.00 | 1.00 ± 0.00 |
| 0: 0/1: Rare. 1-5/phf*/2: 6-10/phf*/3: Heavy infiltrate/ 4: Packed Giant Calls | 26 W | 0.80 ± 0.55 | 0.57 ± 0.53 | 1.00 ± 0.00 |
| | 12 W | 1.00 ± 0.00 | 0.00 ± 0.00 | 0.00 ± 0.00 |
| 0: 0/1: Rare. 1-5/phf*/2: 6-10/phf*/3: Heavy infiltrate/ 4: Packed Necrosis/Tissue Degeneration | 26 W | 1.00 ± 0.00 | 0.14 ± 0.38 | 0.40 ± 0.55 |
| | 12 W | 2.50 ± 0.58 | 1.83 ± 0.75 | 1.50 ± 0.58 |
| 0: 0/1: Slight/2: Moderate/3: Marked/4: Severe Infection | 26 W | 1.20 ± 1.3 | 1.00 ± 1.00 | 1.40 ± 1.14 |
| | 12 W | 0.00 ± 0.00 | 0.00 ± 0.00 | 0.00 ± 0.00 |
| 0: 0/1: Slight/2: Moderate/3: Marked/4: Severe Fibrinous exudate | 26 W | 0.00 ± 0.00 | 0.00 ± 0.00 | 0.00 ± 0.00 |
| | 12 W | 0.00 ± 0.00 | 0.00 ± 0.00 | 0.00 ± 0.00 |
| 0: 0/1: Slight/2: Moderate/3: Marked/4: Severe Neovascularisation | 26 W | 0.00 ± 0.00 | 0.00 ± 0.00 | 0.00 ± 0.00 |
| | 12 W | 2.25 ± 0.50 | 1.50 ± 1.84 | 1.00 ± 0.00 |
| 0: 0/1: Minimal (1-3 capillary buds/2: Groups of 4-7 capillaries with supporting fibroblastic structures/ 3: Broad band of capillaries with supporting structures/4: Extensive band of capillaries with supporting fibroblastic structures | 26 W | 1.20 ± 1.10 | 0.29 ± 0.49 | 0.80 ± 0.84 |

TABLE 2-continued

Parameters for the evaluation of tissues adjacent to implant site

| Histological calls evaluation for Cell Typo/Response | | ARTiCAR | Defect | Autograft |
|---|---|---|---|---|
| Fatty infiltrate | 12 W | 0.00 ± 0.00 | 0.00 ± 0.00 | 0.00 ± 0.00 |
| 0: 0/1: Minimal amount of fat associated with fibrosis/2: Several layers of fate and fibrosis/3: Elongated and broad accumulation of fat cells about the implant site/4: Extensive fat completely surrounding the implant | 26 W | 0.00 ± 0.00 | 0.00 ± 0.00 | 0.00 ± 0.00 |
| Fibrocytes/fibroconnective tissue, fibrosis | 12 W | 2.75 ± 0.50 | 1.83 ± 0.98 | 1.50 ± 0.56 |
| 0: 0/1: Narrow band/2: Moderately thick band/3: Thick band/4: Extensive band | 26 W | 1.60 ± 1.14 | 0.71 ± 0.76 | 1.20 ± 1.10 |
| Cartilage and/or cartilage fibrocartilage formation deeper than the defect | 12 W | 1.25 ± 0.50 | 1.67 ± 0.52 | 0.75 ± 0.50 |
| 0: 0/1: Slight/2: Moderate/3: Marked/4: Severe | 26 W | 0.40 ± 0.89 | 1.29 ± 0.76 | 1.00 ± 0.00 |
| Approximate depth of tissue reaction | 12 W | 10.50 ± 4 | 7.33 ± 1.63 | 9.00 ± 2.00 |
| Evaluated in mm | 26 W | 7.60 ± 4.51 | 8.93 ± 5.25 | 9.40 ± 4.16 |
| Void space underneath defect | 12 W | NA | NA | NA |
| P: Present/A: Absent | 26 W | NA | NA | NA |
| Mucocinous material | 12 W | NA | NA | NA |
| P: Present/A: Absent | 26 W | NA | NA | NA |
| Hemosiderin-laden macrophages | 26 W | 0.50 ± 0.58 | 0.67 ± 0.52 | 0.50 ± 0.56 |
| 0: 0/1: Slight/2: Moderate/3: Marked/4: Severe | 12 W | 0.80 ± 0.45 | 0.29 ± 0.49 | 0.20 ± 0.45 |

After either 12 or 26 weeks from implant, safety parameters were evaluated for ARTiCAR (n=4-7 at 12 weeks; n=4-7 at 26 weeks) and compared to autograft (n=4 at 12 weeks; n=6 at week 26) treatment (comparable to mosaicplasty currently performed for cartilage treatment in surgery) and to no-treatment (n=6 at week 12; n=7 at week 26). Values are represented as mean±SD. NA: not applicable, phf*: per high powered (×400) field.

Statistical Analysis

Results from the WST1 assay were statistically evaluated using 1-Way ANOVA followed by Tukey post-hoc test on Prism 4.03 (GraphPad). A p value ≤0.05 was considered significant. One-way ANOVA followed by Bonferroni post-hoc test was used to compare haematological and biochemical parameters in the blood tests, using Prism 4.03. A p value ≤0.05 was considered significant. Both SigmaPlot (SYSTAT Software) and Prism 5.0 (GraphPad) were used to compare the ICSR II scores from the in vivo experiments in sheep. Equal variance test and normality tests were performed. Either one- (differences induced by treatment) or two-way ANOVA (differences induced by both treatment and time) followed by Bonferroni post-hoc test were used to assess significant differences among the continuous variables of the study groups. If either equal variance test or normality test failed, a Kruskal-Wallis one-way ANOVA with Dunn's correction was conducted. A p value ≤0.1 was considered significant.

EXAMPLES

Example 1: Cytotoxicity of the NanoM1-BMP2 Wound Dressing In Vitro (Step 1)

The nanofibrous PCL wound dressing component for the bone wound patch (c) (NanoM1-BMP2; FIG. 1A) of the ARTiCAR combined ATMPs was tested for cytotoxicity on MRC-5 foetal lung fibroblasts in vitro. Cells were seeded in the presence of the NanoM1-BMP2 wound dressing and compared to positive (polyurethane film; RM-A) and negative (high density polyethylene film; RM-C) controls. Different sizes of both the NanoM1-BMP2 membrane and the control films were tested in the range of 1-20 mm². Cell density and morphology were qualitatively evaluated by bright field microscopy. Cells cultured in the presence of RM-A started to detach already after 24 hours (FIG. 2A-E). One the contrary, cells cultured in the presence of the NanoM1-BMP2 scaffold did not show any morphological abnormalities (FIG. 2F-J), as they did those cultured in the presence of RM-C films (FIG. 2K-O). Next, we assessed the viability of the MRC-5 cells in the 3 conditions tested, using the WST-1 live/dead cell assay. Both RM-A and NanoM1-BMP2 showed a decrease in cell viability over 24 hours that was directly proportional to the size of the membrane used, as the interpolated trend lines indicated (solid black lines in FIG. 2P-R). However, in the presence of 20 mm² RM-A, the cell viability reduced to 72±5% compared to t0 (FIG. 2P, p≤0.05), while in the presence of a fragment of NanoM1-BMP2 of the same size, the cell viability reduced to 97±5% (FIG. 2Q). No significant reduction of the cell number was also observed in the presence of the negative control film (FIG. 2R). These results indicate that the NanoM1-BMP2 is not toxic to MRC-5 cells in vitro.

Example 2: Acute Toxicity, Biodistribution and Persistence of Human Cells after Intra-Articular Implant of the ARTiCAR Combined ATMPs in Nude Rats (Step 2)

The acute toxicity of the ARTiCAR was evaluated in vivo in nude rats, and compared to the non active part of the implant (hydrogel without hMSCs) as a vehicle. Clinical, haematological and biochemical parameters were evaluated. The biodistribution and the persistence of the transplanted cells were also assessed. Briefly, ARTiCAR combined ATMPs (group 1) or vehicles (group 2) were implanted into femoral defects in nude rats. Ventricular blood was taken before the animals were euthanised, 7 days post implant, and femurs were collected for histopathology analysis. Neither the ARTiCAR combined ATMPs, nor the vehicle triggered any significant effect on the body weight, either in female or male rats, over a period on 90 days following the implant (FIG. 3A). Haematological parameters (FIG. 3B). showed no significant differences among the 4 groups of animals (group 1 male, group 1 female, group 2 male, group 2 female). Biochemical parameters were also assessed (FIG. 3C). Female rats in Group 1 showed significantly higher plasmatic concentrations of both Alanine aminotransferase (ALAT; 17.0±2.0 U/l vs. 13.2±1.6 U/l for group 1 and 2, respectively; p≤0.05) and Calcium (91.74±1.02 mg/l vs. 88.46±0.91 mg/l for group 1 and 2, respectively; p≤0.05) than those in group 2. These differences were not associated with any additional symptoms and, altogether, the analysis of the haematological and biochemical parameters considered did not show any clinically relevant differences between ARTiCAR-treated animals and the control group. The femur-tibia joints were also collected and subject to histological analysis. Both the ARTiCAR and the vehicle induced comparable levels of inflammatory response at the implant site (delimited by asterisks in 3D,E), compatible with the bone healing process of the induced bone defect (FIG. 3D,E). Eventually, the biodistribution of the human MSCs at day 90 post implant was also assessed, using qPCR for detecting human DNA. Signal from hMSCs DNA was never detected above the threshold level, except in the testis of one male rat in group 1. The migration of the PCR product on 2.5% agarose gel confirmed the specificity of the amplification product. Taken together, clinical, haematological and biochemical data suggest that the ARTiCAR implant did not induce any clinically relevant symptoms; the inflammatory response detected from the histological analysis of the implant site revealed no differences with the control group, strongly indicating the safety of the ARTiCAR implant for the treatment of bone defects.

Example 3: Histopathology Analyses of the ARTiCAR Intra-Articular Implant in a Large Animal Model (Step 3)

To further confirm the safety of the ARTiCAR combined ATMPs, and to assess the feasibility of its usage in large animals, osteoarticular defects were induced in femoral condyles of adult sheep and were either left unfilled (no-treatment control: NT) of filled with the ARTiCAR implant or with an autograft (AG). The healing process was monitored non-invasively by means of magnetic resonance imaging (MRI) at 0, 12 and 26 weeks (FIG. 4A-C). After either 12 or 26 weeks from implant, sheep were euthanized and the femur-tibia joints were explanted and scanned via micro-computing tomography (micro-CT; FIG. 4D); a 3D surface rendering of the joint was also built from 2D section images (FIG. 4E). The explanted joints were macroscopically scored according to the ICRS score system as follows: grade I=normal cartilage, grade II=nearly normal, grade III=abnormal cartilage and grade IV=severely abnormal cartilage (FIG. 4F). Eventually, the explants were stained in a solution of safranin o—fast green and examined histologically (FIG. 4G). The following parameters were taken into consideration within the repaired tissue and scored according to ICRS II score system: subchondral bone abnormalities/marrow fibrosis, tissue morphology, cell morphology, basal integration, formation of a tidemark, vascularization, overall assessment and mid/deep zone assessment (table 1). In general, a correct subchondral bone formation, a proper osteochondral remodeling zone and a good integration between graft and host tissues were observed within the induced bone defect 26 weeks after treatment in all the experimental groups considered (FIG. 4G,H). Interestingly, 12 weeks post implant, the ARTiCAR-treated defects showed reduced vascularization (66±16%), poorer quality of the subchondral bone (25±24%) and reduced tidemark (29±34%) (FIG. 4H, left panels). These scores were aligned to the NT group (80±14%; 54±30%; 44±30%, respectively), but significantly different to the AG group (100±0%, p≤0.05; 88±6%, p≤0.05; 80±16%; p≤0.1, respectively). However, the ARTiCAR group showed a better vascularization (2.5±0.5) and a higher degree of fibrosis (2.75±0.5) then the AG groups in the tissues adjacent to the defect (p≤0.1 for both parameters), but not a level of fibrocartilage formation as high as in the NT control (p≤0.1 and p≤0.05 at 12 and 26 weeks post implant, respectively) (FIG. 4H, right panels, black arrow in FIG. 4J). These results suggest that the ARTiCAR might induce a low inflammatory response that in turn triggers regeneration38, inducing subchondral bone formation (yellow arrow in FIG. 4K-N) and promoting effective healing in the long term. Moreover, at 26 weeks post implant, matrix staining, surface/superficial assessment, mid/deep zone assessment and overall assessment showed the highest scores for the ARTiCAR group (table 1), and no polymorphonuclear cells, infection, fibrinous exudates and fatty infiltrates were detected in the tissue adjacent to the defect in both the ARTiCAR and the AG groups (table 2), indicating that the ARTiCAR combined ATMPs treatment has a safety over the long term comparable to that of an autograft.

In conclusion, the global cartilage repair/regeneration market is valued at USD 4.2 billion in 2016 and is expected to grow at a CAGR of 5.4% during the 2014-2025 period, owing to the increased life expectancy. Currently, the international standard treatment for OA is total knee arthroplasty (TKA). Despite its rapidly increasing utilization (77,000 patients/year younger than 55 years, in the US), TKA is suboptimal in young, physically active patients, as it induces fibrocartilage formation, cellular hyper- or hypotrophy and the lack of a proper interface between cartilage and subchondral bone. Regenerative nanomedicine combines the use of biomaterials, nanotechnologies and cells to offer better solutions to issues like OAR, where a complex interface regeneration is required. In this work, we assessed the feasibility, non-invasive monitoring and safety of the ARTiCAR combined ATMPs. Similarly to other smart implantable scaffolds that promote osteochondral differentiation, the ARTiCAR releases BMP2. However, thanks to the nanoreservoir technology that provide cell contact-dependent, spatial-temporal release, the total amount of BMP2 used in ARTiCAR is 10,000 times lower than that of BMP2-soaked collagen membranes used in the clinic (McKay W F, Peckham S M, Badura J M. A comprehensive clinical review of recombinant human bone morphogenetic protein-2 (INFUSE Bone Graft). Int Orthop 31, 729-734 (2007)), reducing both potential inflammatory side effects (FIG. 3D; FIG. 4G,H,K,N) and the overall costs of the procedure. Differently to other approaches where a poor subchondral bone regeneration was achieved (Buda R, Vannini F, Cavallo M, Grigolo B, Cenacchi A, Giannini S. Osteochondral lesions of the knee: a new one-step repair technique with bone-marrow-derived cells. J Bone Joint Surg Am 92 Suppl 2, 2-11 (2010); and Giannini S, et al. One-step repair in talar osteochondral lesions: 4-year clinical results and t2-mapping capability in outcome prediction. Am J Sports Med 41, 511-518 (2013)), the ARTiCAR address simultaneous regeneration of both the subchondral bone and the cartilage (FIG. 4G,K,N), representing an innovative technology for promoting OAR in a localized osteochondral defect. For cartilage regeneration, the ARTiCAR incorporates MSCs. Human MSCs are currently used in clinical trials for promoting OAR, because of their transdifferentiation potential coupled to immunomodulatory effect. However, since tumorigenicity of MSCs is debated, the biodistribution of hMSCs is a critical concern of preclinical safety (Goldring C E, et al. Assessing the safety of stem cell therapeutics. Cell Stem Cell 8, 618-628 (2011); and Sensebe L, Fleury-Cappellesso S. Biodistribution of mesenchymal stem/stromal cells in a preclinical setting. Stem Cells Int 2013, 678063 (2013)). After the implant of ARTiCAR, traces of hMSC DNA were found in the testes of one male nude rat, out of 40 implanted animals (FIG. 3C), highlighting the safety of the ARTiCAR implant.

In summary, the present invention showed the feasibility of the ARTiCAR implant in a large animal model and the possibility to follow OAR non-invasively, by mean of MRI (FIG. 4A-C). More importantly, the safety of the ARTiCAR was showed, as no acute or long term toxicity was detected, neither in nude rats (FIG. 3D), nor in sheep (FIG. 4G,H,K, N). Therefore, the ARTiCAR can enter phase I clinical trials as a treatment for OA, tendon degeneration and other age-related degenerative musculoskeletal issues. As such, the ARTiCAR could replace current invasive treatments, with the potential to impact 300,000 to 450,000 patients/year only in the US ($4-5 billion global market).

The invention claimed is:

1. A biomaterial comprising:
   (a) a membrane wound patch made of a nanofibrous polymeric scaffold;
   (b) a hydrogel including stem cells, and
   (c) a bone wound patch of a nanofibrous patch scaffold made of polymers, wherein said nanofibrous patch scaffold has a surface coated with an interrupted coating made of multilayered droplets, said multilayered droplets being droplets composed of at least one layer pair consisting of a layer of polyanions and a layer of polycations, and wherein the bone wound patch further comprises a bone growth factor; and
   wherein the hydrogel is located between the membrane wound patch and the bone wound patch.

2. The biomaterial of claim 1, wherein
   the nanofibrous scaffold of the membrane wound patch has a surface being coated with either
   (i) an interrupted coating made of multilayered droplets, said multilayered droplets being droplets composed of at least one layer pair consisting of a layer of polyanions including at least chondroitin sulfate and/or hyaluronic acid, and a layer of polycations, or
   (ii) a continuous coating comprising more than 15 layer pairs, each layer pair consisting of a layer of polyanions including at least chondroitin sulfate and/or hyaluronic acid, and a layer of polycations; and
   wherein the hydrogel (b) includes autologous or allogenic bone marrow-derived mesenchymal stem cells.

3. The biomaterial of claim 1, wherein the hydrogel comprises hyaluronic acid and/or alginate.

4. The biomaterial of claim 2, wherein the nanofibrous polymeric scaffold of the membrane wound patch is made of a polymer selected from the group consisting of polyesters, polyamides, polyurethanes and polyureas, poly(amide-enamine)s, polyanhydrides, polymers produced from microbial, vegetal, marine or animal sources, and polymer blends thereof.

5. The biomaterial of claim 2, wherein the nanofibrous polymeric scaffold of the membrane wound patch is made of poly($\varepsilon$-caprolactone), optionally including chondroitin sulfate and/or hyaluronic acid.

6. The biomaterial of claim 2, wherein the nanofibrous polymeric scaffold of the bone wound patch is made of a polymer selected from the group consisting of: polyesters, polyamides, polyurethanes and polyureas, poly(amide-enamine)s, polyanhydrides, polymers produced from microbial, vegetal, marine or animal sources, and polymer blends thereof.

7. The biomaterial of claim 2, wherein the nanofibrous polymeric scaffold of the bone wound patch is made of poly($\varepsilon$-caprolactone) or of collagen.

8. The biomaterial of claim 2, wherein the surface of the nanofibrous scaffold of the membrane wound patch is coated with the interrupted coating made of the multilayered droplets.

9. The biomaterial of claim 2 wherein the surface of the nanofibrous scaffold of the membrane wound patch is coated with the continuous coating comprising more than 15 layer pairs.

10. The biomaterial of claim 1, wherein the bone growth factor is selected from the group consisting of: a vascular endothelial growth factor (VEGF), a bone morphogenetic protein (BMP), a transforming growth factor (TGF), a fibroblast growth factor (FGF), a nucleic acid coding therefor, and mixtures thereof.

11. The biomaterial of claim 1, wherein the bone wound patch is made of a poly($\varepsilon$-caprolactone) scaffold including chitosan/BMP2 droplets.

12. The biomaterial of claim 1, wherein the membrane wound patch is made of a poly($\varepsilon$-caprolactone) scaffold including chondroitin sulfate/hyaluronic acid droplets.

13. A method for treating a cartilage lesion, said method comprising successively a step of applying a bone wound patch of a nanofibrous patch scaffold made of polymers, wherein said nanofibrous patch scaffold has a surface coated with an interrupted coating made of multilayered droplets, said multilayered droplets being droplets composed of at least one layer pair consisting of a layer of polyanions and a layer of polycations, and wherein the bone wound patch further comprises a bone growth factor, a step of applying a hydrogel including stem cells and a step of applying a membrane wound patch made of a nanofibrous polymeric scaffold.

14. A method for treating bone and/or cartilage regeneration, said method comprising successively a step of applying a bone wound patch of a nanofibrous patch scaffold made of polymers, wherein said nanofibrous patch scaffold has a surface coated with an interrupted coating made of multilayered droplets, said multilayered droplets being droplets composed of at least one layer pair consisting of a layer of polyanions and a layer of polycations, and wherein the bone wound patch further comprises a bone growth factor, a step of applying a hydrogel including stem cells and a step of applying a membrane wound patch made of a nanofibrous polymeric scaffold.

15. A method for treating a bone and/or cartilage defect, said method comprising successively a step of applying a bone wound patch of a nanofibrous patch scaffold made of polymers, wherein said nanofibrous patch scaffold has a surface coated with an interrupted coating made of multilayered droplets, said multilayered droplets being droplets composed of at least one layer pair consisting of a layer of polyanions and a layer of polycations, and wherein the bone wound patch further comprises a bone growth factor a step of applying a hydrogel including stem cells and a step of applying a membrane wound patch made of a nanofibrous polymeric scaffold.

16. A method for treating and/or reducing an incidence of osteoarthritis, said method comprising a step of applying the biomaterial of claim 2, or the following steps i) to iii) applied sequentially:

i) applying a bone wound patch of a nanofibrous patch scaffold made of polymers, wherein said nanofibrous patch scaffold has a surface coated with an interrupted coating made of multilayered droplets, said multilayered droplets being droplets composed of at least one layer pair consisting of a layer of polyanions and a layer of polycations, and wherein the bone wound patch further comprises a bone growth factor, ii) applying a hydrogel including autologous or allogenic bone marrow-derived mesenchymal stem cells, and iii) applying a membrane wound patch made of a nanofibrous polymeric scaffold having a surface being coated with either:
  (i) an interrupted coating made of multilayered droplets, said multilayered droplets being droplets composed of at least one layer pair consisting of a layer of polyanions including at least chondroitin sulfate and/or hyaluronic acid, and a layer of polycations, or
  (ii) a continuous coating comprising more than 15 layer pairs, each layer pair consisting of a layer of polyanions including at least chondroitin sulfate and/or hyaluronic acid, and a layer of polycations in a patient in need thereof.

17. A method for treating and/or reducing the incidence of osteoarthritis, said method comprising a step of applying a biomaterial in a patient in need thereof, wherein said biomaterial comprises:
  (a) a membrane wound patch, made of a nanofibrous polymeric scaffold, wherein said polymeric scaffold has a surface being coated with either
    (ii) an interrupted coating made of multilayered droplets, said multilayered droplets being droplets composed of at least one layer pair consisting of a layer of polyanions including at least chondroitin sulfate and/or hyaluronic acid, and a layer of polycations, or
    (ii) a continuous coating comprising more than 15 layer pairs, each layer pair consisting of a layer of polyanions including at least chondroitin sulfate and/or hyaluronic acid, and a layer of polycations;
  (b) a bone wound patch of a nanofibrous patch scaffold made of polymers, wherein said nanofibrous patch scaffold has a surface coated with an interrupted coating made of multilayered droplets, said multilayered droplets being droplets composed of at least one layer pair consisting of a layer of polyanions and a layer of polycations, and wherein the bone wound patch further comprises a bone growth factor;
  autologous or allogenic bone marrow-derived mesenchymal stem cells,
  a solution of hyaluronic acid and alginate, and
  a solution of calcium chloride or calcium phosphate.

18. A kit for treating and/or reducing an incidence of osteoarthritis, comprising:
  (a) a membrane wound patch, made of a nanofibrous polymeric scaffold;
  (b) a hydrogel including stem cells, and
  (c) a bone wound patch of a nanofibrous patch scaffold made of polymers, wherein said nanofibrous patch scaffold has a surface coated with an interrupted coating made of multilayered droplets, said multilayered droplets being droplets composed of at least one layer pair consisting of a layer of polyanions and a layer of polycations, and wherein the bone wound patch further comprises a bone growth factor.

19. The kit for treating and/or reducing an incidence of osteoarthritis as claimed in claim 18, wherein
  the nanofibrous polymeric scaffold of the membrane wound patch has a surface being coated with either:
  (i) an interrupted coating made of multilayered droplets, said multilayered droplets being droplets composed of at least one layer pair consisting of a layer of polyanions including at least chondroitin sulfate and/or hyaluronic acid, and a layer of polycations, or
  (ii) a continuous coating comprising more than 15 layer pairs, each layer pair consisting of a layer of polyanions including at least chondroitin sulfate and/or hyaluronic acid, and a layer of polycations; and
  wherein the hydrogel includes autologous or allogenic bone marrow-derived mesenchymal stem cells.

20. A kit for treating and/or reducing an incidence of osteoarthritis, comprising:
  a membrane wound patch, made of a nanofibrous polymeric scaffold, wherein said polymeric scaffold has a surface being coated with either
    (i) an interrupted coating made of multilayered droplets, said multilayered droplets being droplets composed of at least one layer pair consisting of a layer of polyanions including at least chondroitin sulfate and/or hyaluronic acid, and a layer of polycations, or
    (ii) a continuous coating comprising more than 15 layer pairs, each layer pair consisting of a layer of polyanions including at least chondroitin sulfate and/or hyaluronic acid, and a layer of polycations;
  a bone wound patch being a nanofibrous scaffold made of polymers, wherein said scaffold has a surface coated with an interrupted coating made of multilayered droplets, said multilayered droplets being droplets composed of at least one layer pair consisting of a layer of polyanions and a layer of polycations, and wherein the bone wound patch further comprises a bone growth factor;
  autologous or allogenic bone marrow-derived mesenchymal stem cells,
  a solution of hyaluronic acid and alginate, and
  a solution of calcium chloride or calcium phosphate.

* * * * *